(12) United States Patent
Iversen et al.

(10) Patent No.: US 12,054,676 B2
(45) Date of Patent: *Aug. 6, 2024

(54) BLEND OF HYDROCARBON CONTAINING FOSSIL AND RENEWABLE COMPONENTS AND METHOD FOR PRODUCING SUCH BLEND

(71) Applicant: Steeper Energy ApS, Vedbæk (DK)

(72) Inventors: Steen Brummerstedt Iversen, Vedbæk (DK); Julie Katerine Rodriguez Guerrero, Calgary (CA)

(73) Assignee: STEEPER ENERGY APS, Vedbæk (DK)

( * ) Notice: Subject to any disclaimer, the term of this patent is extended or adjusted under 35 U.S.C. 154(b) by 253 days.

This patent is subject to a terminal disclaimer.

(21) Appl. No.: 17/611,258

(22) PCT Filed: May 15, 2020

(86) PCT No.: PCT/EP2020/025223
§ 371 (c)(1),
(2) Date: Nov. 15, 2021

(87) PCT Pub. No.: WO2020/228991
PCT Pub. Date: Nov. 19, 2020

(65) Prior Publication Data
US 2022/0235275 A1   Jul. 28, 2022

(30) Foreign Application Priority Data
May 15, 2019   (DK) .......................... PA 2019 00582

(51) Int. Cl.
*C10G 1/06* (2006.01)
*C10G 1/00* (2006.01)
(Continued)

(52) U.S. Cl.
CPC ............... *C10G 1/06* (2013.01); *C10G 1/008* (2013.01); *C10L 1/026* (2013.01); *C10L 10/00* (2013.01);
(Continued)

(58) Field of Classification Search
CPC .. C10G 1/06; C10G 1/008; C10G 2300/1014; C10G 2300/202; C10G 2300/203;
(Continued)

(56) References Cited

U.S. PATENT DOCUMENTS

| | | | |
|---|---|---|---|
| 2007/0094919 A1 | 5/2007 | Haan et al. | |
| 2011/0126449 A1* | 6/2011 | Xu | C10L 1/08 44/388 |
| 2019/0127651 A1 | 5/2019 | Kar et al. | |

FOREIGN PATENT DOCUMENTS

| | | | | |
|---|---|---|---|---|
| CA | 2 935 825 A1 | 1/2018 | | |
| WO | WO-2015177531 A1 * | 11/2015 | ............. | C10G 21/12 |
| WO | WO-2018015768 A1 * | 1/2018 | ............. | C10G 21/02 |

OTHER PUBLICATIONS

Fioroni, G., Fouts, L., Luecke, J., Vardon, D. et al., "Screening of Potential Biomass-Derived Streams as Fuel Blendstocks for Mixing Controlled Compression Ignition Combustion," SAE Int. J. Adv. & Curr. Prac. in Mobility 1(3):1117-1138, 2019 (Year: 2019).*

(Continued)

*Primary Examiner* — Cephia D Toomer
(74) *Attorney, Agent, or Firm* — Birch, Stewart, Kolasch & Birch, LLP

(57) ABSTRACT

The invention relates to a hydrocarbon blend for input to a refinery and comprising a first blend component containing a renewable hydrocarbon component and a second blend component containing petroleum derived hydrocarbon to form at least part of a final hydrocarbon blend for processing in a refinery where the first blend component is characterized by comprising a hydrocarbon substance with at least (Continued)

70% by weight having a boiling point above 220° C. and by having the characteristics $(\delta_{d1}, \delta_{\rho 1}, \delta_{h1})=(17\text{-}20, 6\text{-}12, 6\text{-}12)$ and; where the second blend component is characterised by having the characteristics $(\delta_{d2}, \delta_{\rho 2}, \delta_{h2})=(17\text{-}20, 3\text{-}5, 4\text{-}7)$, where the first blend component is present in the final hydrocarbon blend in a relative amount of up to 80 wt %.

34 Claims, 22 Drawing Sheets

(51) Int. Cl.
*C10L 1/02* (2006.01)
*C10L 10/00* (2006.01)

(52) U.S. Cl.
CPC .............. *C10G 2300/1014* (2013.01); *C10G 2300/202* (2013.01); *C10G 2300/203* (2013.01); *C10G 2300/301* (2013.01); *C10G 2300/302* (2013.01); *C10G 2300/304* (2013.01); *C10G 2300/4006* (2013.01); *C10G 2300/4012* (2013.01); *C10L 2200/0453* (2013.01); *C10L 2200/0484* (2013.01); *C10L 2290/24* (2013.01); *C10L 2290/60* (2013.01)

(58) Field of Classification Search
CPC ........ C10G 2300/301; C10G 2300/302; C10G 2300/304; C10G 2300/4006; C10G 2300/4012; C10G 2300/1011; C10G 2300/1048; C10G 2300/1074; C10G 1/065; C10L 1/026; C10L 10/00; C10L 2200/0453; C10L 2200/0484; C10L 2290/24; C10L 2290/60; Y02E 50/10; Y02P 30/20
See application file for complete search history.

(56) References Cited

OTHER PUBLICATIONS

Batista et al., "Determination of the Hansen Solubility Parameters of Vegetable Oils, Biodiesel, Diesel, and Biodiesel-Diesel Blends", J Am Oil Chem Soc, 2015, vol. 92, pp. 95-109.
International Search Report, issued in PCT/EP2020/025223, dated Aug. 5, 2020.
Written Opinion of the International Searching Authority, issued in PCT/EP2020/025223, dated Aug. 5, 2020.

* cited by examiner

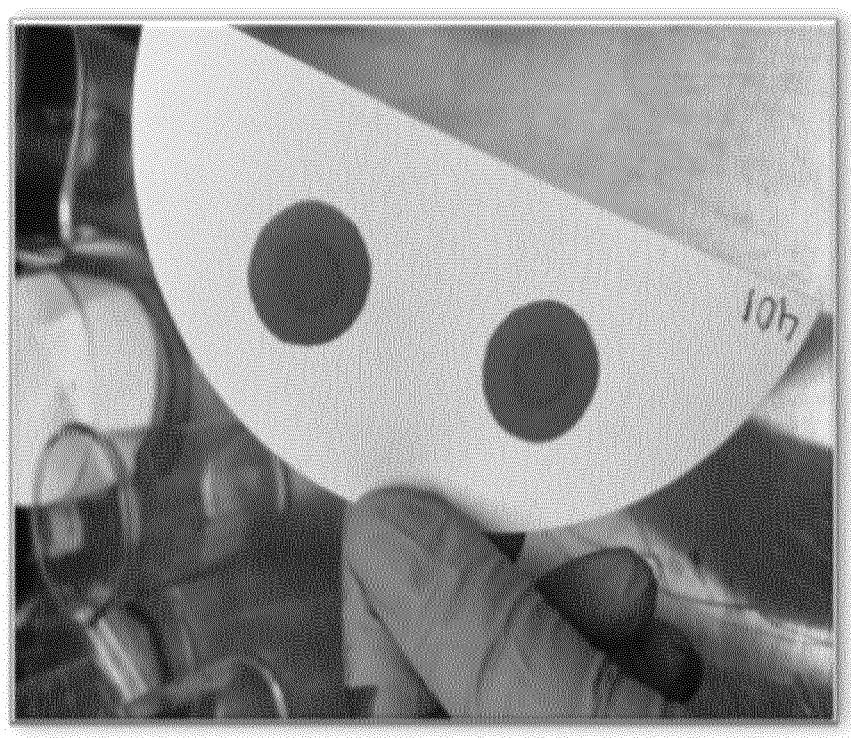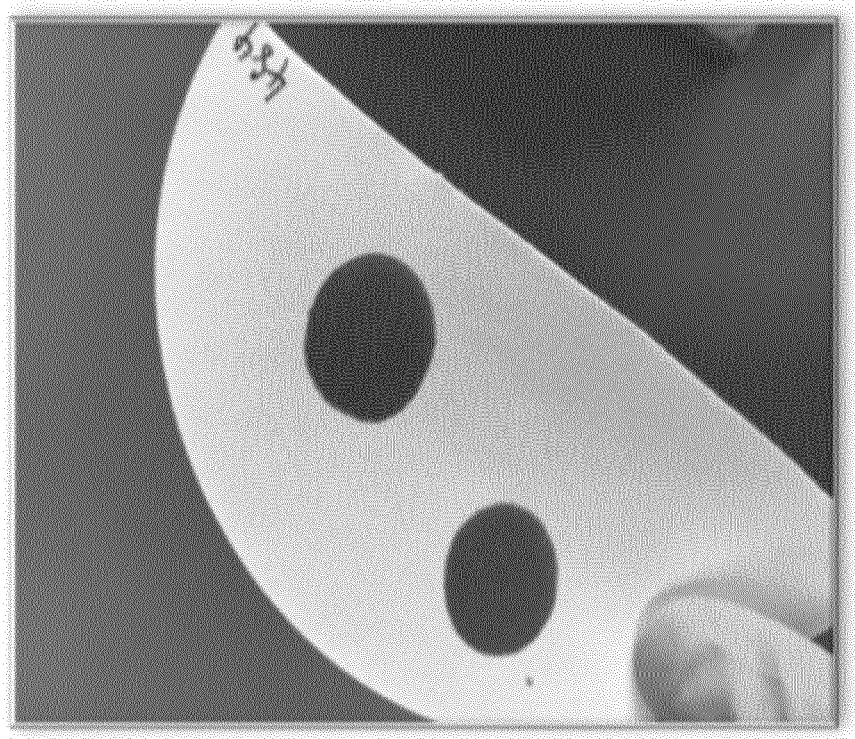
Fig. 7
a) Soluble: (1)
b) Partial soluble: (2)

| Solvents | Parameters [Mpa^(1/2)] | | | Oil A | | Oil B | | Oil C | | Partially Upgraded Oil | | Upgraded Oil | | Fossil crude 2 | |
|---|---|---|---|---|---|---|---|---|---|---|---|---|---|---|---|
| | $\delta_{DL}$ | $\delta_{PL}$ | $\delta_{HL}$ | Score | Red | Score | Red | Score | Red | Score | Red | Score | Red | Score | Red |
| 1 Glycerol | 17.4 | 11.3 | 27.2 | 0 | 1.754 | 0 | 2.578 | 0 | 2.662 | 0 | 3.015 | - | - | - | - |
| 2 Water | 15.5 | 16 | 42.3 | 0 | 3.398 | 0 | 4.957 | 0 | 5.013 | 4 | 5.755 | 4 | 7.46 | 0 | 7.191 |
| 3 Hydrogen Peroxide | 15.5 | 12.2 | 42.7 | 0 | 3.445 | - | - | - | - | - | - | 0 | 7.407 | - | - |
| 4 Acetylacetone | 16.1 | 10 | 6.2 | 1 | 1.007* | 1 | 0.889 | 1 | 0.749 | 1 | 0.983 | 1 | 0.73 | 2 | 1.136 |
| 5 Acetylchloride | 16.2 | 11.2 | 5.8 | 1 | 0.964 | 1 | 0.913 | 1 | 0.797 | 1 | 0.998 | - | - | - | - |
| 6 m-Cresol | 18.5 | 6.5 | 13.7 | 1 | 0.903 | 1 | 0.8 | 1 | 0.805 | 1 | 0.995 | - | - | - | - |
| 7 Cyclopentanone | 17.9 | 11.9 | 5.2 | 1 | 0.794 | 1 | 0.77 | 1 | 0.688 | 1 | 0.829 | 1 | 0.978 | 1 | 0.999 |
| 8 Furfural | 18.6 | 14.9 | 5.1 | 1 | 0.712 | 1 | 0.999 | 1 | 1 | 2 | 1.089 | 2 | 1.612 | 2 | 1.496 |
| 9 o-Methoxyphenol | 18 | 7 | 12 | 1 | 0.849 | 1 | 0.598 | 1 | 0.558 | 1 | 0.753 | 1 | 0.978 | 2 | 1.514 |
| 10 1-Methyl Imidazole | 19.7 | 15.6 | 11.2 | 1 | 0.166 | 1 | 0.886 | 2 | 1.038 | 2 | 1.001 | - | - | 2 | 2.142 |
| 11 Phenol | 18.5 | 5.9 | 14.9 | 1 | 1.003* | 1 | 0.99 | 1 | 1 | 2 | 1.214 | - | - | 3 | 1.037 |
| 12 Tricresyl Phosphate | 19 | 12.3 | 4.5 | 1 | 0.802 | 1 | 0.896 | 1 | 0.842 | - | - | - | - | - | - |
| 13 Tetrahydrofurfuryl Alcohol | 17.8 | 8.2 | 12.9 | 1 | 0.755 | - | - | - | - | - | - | - | - | - | - |
| 14 Acetaldehyde | 14.7 | 12.5 | 7.9 | 2 | 1.066 | - | - | - | - | - | - | - | - | - | - |
| 15 Acetone | 15.5 | 10.4 | 7 | 2 | 1.035 | - | - | - | - | - | - | - | - | - | - |
| 16 Acetonitrile | 15.3 | 18 | 6.1 | 2 | 1.091 | - | - | - | - | - | - | - | - | - | - |
| 17 1-Butanethiol | 16.3 | 5.3 | 4.5 | 2 | 1.397 | - | - | - | - | 2 | 1.477 | - | - | 1 | 0.83 |
| 18 1-Butanol | 16 | 5.7 | 15.8 | 2 | 1.254 | - | - | - | - | - | - | - | - | - | - |
| 19 Diethyl Ether | 14.5 | 2.9 | 4.6 | 2 | 1.773 | - | - | - | - | - | - | - | - | - | - |
| 20 Dimethyl Disulfide | 17.6 | 7.8 | 6.5 | 2 | 0.970* | - | - | - | - | 2 | 0.798* | 1 | 0.252 | 1 | 0.64 |
| 21 Ethyl Acetate | 15.8 | 5.3 | 7.2 | 2 | 1.318 | - | - | - | - | 2 | 1.345 | - | - | 3 | 1.178 |
| 22 Glycidyl Methacrylate | 16.3 | 8.5 | 5.7 | 2 | 1.099 | - | - | - | - | 2 | 1.056 | - | - | - | - |
| 23 Methyl Ethyl Ketone - MEK | 16 | 9 | 5.1 | 2 | 1.145 | - | - | - | - | - | - | 1 | 0.797 | 3 | 1.013 |
| 24 Methyl n-Amyl Ketone | 16.2 | 5.7 | 4.1 | 2 | 1.401 | - | - | - | - | 2 | 1.495 | 1 | 0.998 | - | - |
| 25 Methylene Dichloride | 17 | 7.3 | 7.1 | 2 | 1.029 | - | - | - | - | - | - | 1 | 0.235 | 1 | 0.827 |
| 26 Tetrahydrofuran | 16.8 | 5.7 | 8 | 2 | 1.146 | - | - | - | - | - | - | 1 | 0.541 | - | - |
| 27 Lactic Acid (dl) | 17 | 8.3 | 28.4 | 2 | 1.982 | - | - | - | - | 4 | 3.263 | - | - | 4 | 4.473 |
| 28 Hexanal | 15.8 | 8.4 | 5.3 | 2 | 1.193 | - | - | - | - | 2 | 1.223 | 1 | 0.812 | - | - |
| 29 Anisole | 17.8 | 4.4 | 6.9 | 3 | 1.236 | - | - | - | - | - | - | - | - | - | - |
| 30 Methanol | 14.7 | 12.3 | 22.3 | 3 | 1.52 | - | - | - | - | - | - | - | - | 4 | 3.742 |

Fig. 9a

| # | Solvents | Parameters [Mpa$^{1/2}$] $\delta_D$ | $\delta_P$ | $\delta_H$ | Oil A Score | Oil A Red | Oil B Score | Oil B Red | Oil C Score | Oil C Red | Partially Upgraded Oil Score | Partially Upgraded Oil Red | Upgraded Oil Score | Upgraded Oil Red | Fossil crude 2 Score | Fossil crude 2 Red |
|---|---|---|---|---|---|---|---|---|---|---|---|---|---|---|---|---|
| 31 | Toluene | 18 | 1.4 | 2 | 3 | 1.767 | - | - | - | - | - | - | 2 | 1.823 | 1 | 0.996 |
| 32 | Cyclohexane | 16.8 | 0 | 0.2 | 4 | 2.051 | - | - | - | - | - | - | - | - | - | - |
| 33 | Ethylene Glycol | 17 | 11 | 26 | 4 | 1.661 | - | - | - | - | - | - | 3 | 3.888 | 0 | 4.112 |
| 34 | Hexane | 14.9 | 0 | 0 | 4 | 2.201 | - | - | - | - | - | - | 3 | 2.517 | 0 | 1.858 |
| 35 | Pentane | 14.5 | 0 | 0 | 4 | 2.238 | - | - | - | - | - | - | - | - | - | - |
| 36 | 1-Propanol | 16 | 6.8 | 17.4 | 4 | 1.243 | - | - | - | - | - | - | - | - | - | - |
| 37 | 1-Methyl Imidazole/ Tricresyl Phosphate 66/34 | 19.7 | 15.6 | 11.1 | 1 | 0.169 | - | - | - | - | - | - | - | - | - | - |
| 38 | MEK/Ethylenglycol 90/10 | 16.1 | 9.2 | 7.2 | 1 | 0.996 | - | - | - | - | - | - | - | - | - | - |
| 39 | Acetylacetone/Methanol 79/21 | 15.6 | 10.8 | 11.8 | 1 | 0.869 | - | - | - | - | - | - | - | - | - | - |
| 40 | MEK/Methanol 70/30 | 15.5 | 10.4 | 12.2 | 1 | 0.91 | - | - | - | - | - | - | - | - | - | - |
| 41 | 1-Methyl imidazole/ Dichloromethane 57/43 | 17.9 | 12.6 | 10.6 | 1 | 0.362 | - | - | - | - | - | - | - | - | - | - |
| 42 | MEK/ Ethylene Glycol 90/10 | 16.1 | 9.2 | 7.2 | 1 | 0.996 | - | - | - | - | - | - | - | - | - | - |
| 43 | 1-Methyl Imidazole/ Dimethyl carbonate 53/43 | 17.9 | 12.6 | 10.6 | 1 | 0.362 | - | - | - | - | - | - | - | - | - | - |
| 44 | 1-Methyl Imidazole/ Guaiacol 63/37 | 19.4 | 14.2 | 11.3 | 1 | 0.066 | - | - | - | - | - | - | - | - | - | - |
| 45 | 1-Methyl Imidazole/ Acetylacetone 61/39 | 19.3 | 14.9 | 10.6 | 1 | 0.119 | - | - | - | - | - | - | - | - | - | - |
| 46 | MEK/Ethylenglycol 90/10 | 16.1 | 9.2 | 7.2 | 1 | 0.996 | - | - | - | - | - | - | - | - | - | - |
| 47 | isopropyl acetate/ 1-Methyl imidazole 32/68 | 18.2 | 12 | 10.2 | 1 | 0.376 | - | - | - | - | - | - | - | - | - | - |
| 48 | MEK/Ethanol 66/34 | 15.9 | 8.9 | 12.1 | 1 | 0.931 | - | - | - | - | - | - | - | - | - | - |
| 49 | DCM/Acetone 53/47 | 16.3 | 8.8 | 7.1 | 2 | 0.999* | - | - | - | - | - | - | - | - | - | - |
| 50 | MEK/ Acetonitrile 57/43 | 15.7 | 12.9 | 5.5 | 2 | 1.012 | - | - | - | - | - | - | - | - | - | - |
| 51 | MEK/DCM 42/58 | 16.6 | 8 | 6.3 | 2 | 1.061 | - | - | - | - | - | - | - | - | - | - |
| 52 | Acetone/Toluene 40/60 | 17 | 5 | 4 | 2 | 1.392 | - | - | - | - | - | - | - | - | - | - |
| 53 | Acetone/Toluene 60/40 | 16.5 | 6.8 | 5 | 2 | 1.236 | - | - | - | - | - | - | - | - | - | - |
| 54 | Acetone/Toluene 80/20 | 16 | 8.6 | 6 | 2 | 1.113 | - | - | - | - | - | - | - | - | - | - |
| 55 | Acetone/ethanol 77/23 | 15.6 | 10 | 9.9 | 2 | 0.930* | - | - | - | - | - | - | - | - | - | - |
| 56 | Toluene/Anisole 26/74 | - | - | - | - | - | - | - | - | - | - | - | 1 | 0.683 | - | - |
| 57 | DCM/Toluene 51/49 | - | - | - | - | - | - | - | - | - | - | - | 1 | 0.56 | - | - |
| 58 | MEK/m-cresol 66/34 | - | - | - | - | - | - | - | - | - | - | - | 1 | 0.952 | - | - |
| 59 | Acetylacetone/m-Cresol 64/36 | - | - | - | - | - | - | - | - | - | - | - | 2 | 1.116 | - | - |

Fig. 9b

| Sample | Cycle | Start-up oil | Feedstock | Viscosity [cP] | HHV[b] [MJ/kg] | C[b] [wt.%] | H[b] [wt.%] | N[b] [ppm] | S[b] [ppm] | O[c] [wt.%] | H/C |
|---|---|---|---|---|---|---|---|---|---|---|---|
| Oil A | 5 | CTO[f] | Birch | 813[a] | 38.0 | 80.8 | 9.1 | 2635 | 215 | 9.8 | 1.34 |
| Oil B[d] | 5 | CTO[f] | Pine EW | 14214[a] | 37.6 | 80.5 | 9.4 | - | - | 10.1 | 1.39 |
| Oil C[d] | 5 | CTO[f] | Pine EW | 35218[a] | 37.5 | 80.6 | 9.3 | - | - | 10.1 | 1.37 |
| Partially Upgraded Oil - PUP | - | - | - | 34[e] | 43.3 | 88.6 | 13.4 | 424 | 764 | 0.26 | 1.84 |
| Heavy fraction - PUO | - | - | - | 6757[g] | 42.4 | 90.5 | 9.6 | - | - | 0 | 1.26 |
| Upgraded Oil - UO | - | - | - | - | 44.3 | 87.4 | 12.7 | 0.8 | - | 0.0 | 1.72 |
| Heavy Fraction - UO | - | - | - | - | 43.1 | 89.4 | 10.6 | - | - | 0.0 | 1.42 |

[a] at 40°C; [e] Viscosity at 20°C; [g] Viscosity at 50°C
[b] asis
[c] ence
[d] process performed at 3rd and 5th cycle – HTL process

Fig. 10

| Sample | $\delta_D$ [MPA$^{1/2}$] | $\delta_P$ [MPA$^{1/2}$] | $\delta_H$ [MPA$^{1/2}$] | $R_o$ | Wrong in[b] | Wrong out[c] | Data fit[d] |
|---|---|---|---|---|---|---|---|
| Oil A | 19.19 | 14.52 | 11.61 | 9.3 | 3 | 2 | 0.965 |
| Oil B | 18.36 | 10.43 | 10.06 | 6.7 | 0 | 0 | 1.000 |
| Oil C | 18.13 | 9.59 | 9.24 | 6.8 | 0 | 0 | 1.000 |
| Partially Upgraded Oil - PUO | 17.95 | 10.96 | 9.96 | 5.9 | 1 | 3 | 0.646 |
| Heavy fraction - PUO | 17-19 | 7.5-12 | 7-10 | 5-9 | - | - | - |
| Upgraded Oil - UO | 17.36 | 8.01 | 7.59 | 4.8 | 0 | 0 | 1.000 |
| Heavy Fraction - UO | 17-19 | 7-9.5 | 7-10.5 | 4-8 | - | - | - |
| Fossil Crude oil I | 18.47 | 6.67 | 3.58 | 5.6 | 0 | 0 | 1.000 |
| Fossil Crude oil II[a] | 17.7 | 4.0 | 0.6 | 9.3 | 3[e] | - | 0.936 |
| Bitumen[a] | 18.4 | 3.9 | 3.6 | 5.76 | 3[e] | - | 0.980 |
| VGO | 19.1-19.4 | 3.4-4.2 | 4.2-4.4 | 4-6 | - | - | - |
| ULSFO | 18-19.7 | 3-6 | 3-4.5 | 4-6.5 | - | - | - |
| HSFO | 18-19.7 | 3-6 | 3-6 | 4-6 | - | - | - |

[a] P. Redelius, "Bitumen solubility model using hansen solubility parameter," *Energy and Fuels*, vol. 18, no. 4, pp. 1087–1092, 2004
[b] Solvents that do not dissolve the solute but are inside the sphere
[c] Solvents that dissolve the solute but are outside the sphere
[d] Fit accuracy
[e] Outliers

Fig. 14

| | Blendstocks | | | Low sulfur RMG 180 | RMG 180 <0.1 wt% S | |
|---|---|---|---|---|---|---|
| | ULSFO | RMG 380 HSFO | Steeper HF | Blend | Minimum Spec | Maximum Spec |
| Density, kg/m³ | 888 | 990 | 1033 | 979.9 | - | 991 |
| Sulfur, wt % | 0.10 | 2.49 | 0.02 | 0.096 | - | 0.10 |
| Flash Point, °C | 91 | 90.5 | 125 | 104 | 60 | - |
| Pour Point, °C | 9 | -9 | 24 | 19.7 | - | 30 |
| Viscosity at 50 °C | 14.2 | 371.5 | 6757 | 172.9 | 160 | 180 |
| Ash, wt % | 0.005 | 0.100 | 0.12 | 0.082 | - | 0.100 |
| Conradson Carbon Residue, wt % | 1.89 | 15.8 | 14.46 | 10.4 | | 18.0 |
| Water & sediment, vol % | 0.10 | 0.50 | 0.21 | 0.2 | - | 0.50 |
| Total Sediment Potential, wt % | 0.01 | 0.03 | - | 0.00 | - | 0.1 |
| Vanadium, ppm w | 1 | 189 | - | 4.1 | - | 350 |
| Aluminum+Silicon, ppm w | 15 | 60 | - | 6.1 | - | 60 |
| ULO-Zinc, ppm W | 1 | 0 | - | 0.3 | - | 15 |
| ULO-Phosphorus, ppm w | 1 | 0 | - | 0.3 | - | 15 |
| ULO-Calcium, ppm w | 6 | 4 | - | 2.0 | - | 30 |
| Acid Number, mg KOH/g | 0 | 0 | 0 | 0.0 | - | 2.5 |
| Sodium, mg/kg | 0 | 28 | - | 0.6 | - | 100 |
| Asphaltenes, wt % | 0 | 0 | - | 0.00 | - | 10 |
| H₂S, mg/kg | 0.4 | 0.6 | - | 0.1 | - | 2 |
| CCAI | 797 | 851 | - | 849.6 | - | 860 |
| BMCI | 38.7 | 75.2 | - | 72.2 | 70 | - |
| vol % | 36.0% | 2.0% | 62.0% | 100.0% | | |

Fig. 16

50 wt.% HFPUO (3% Oxygen)/ 50 wt.% MGO
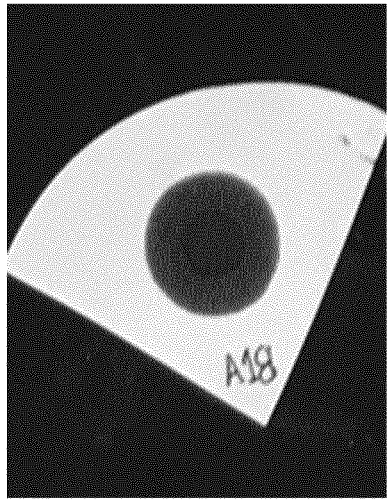
Incompatible by spot test
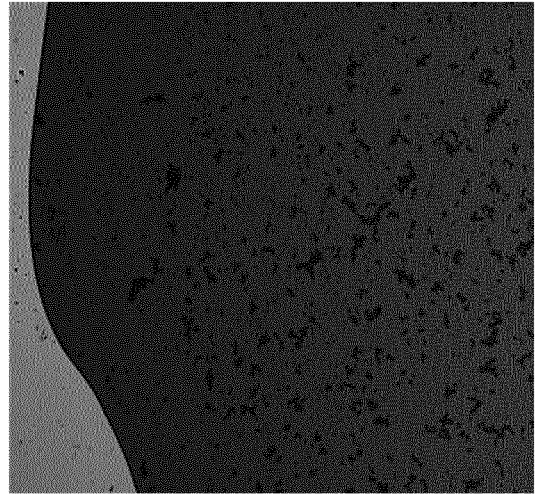
Solids by Microscope
25 wt.% HFPUO (3 Oxygen)/ 75 wt.% MGO
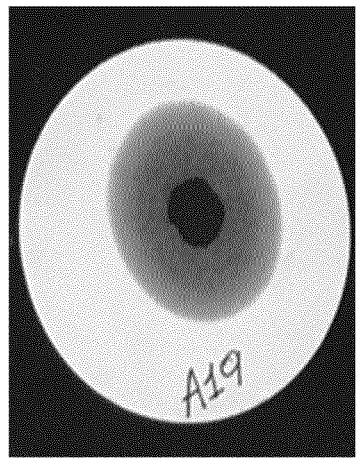
Incompatible by spot test
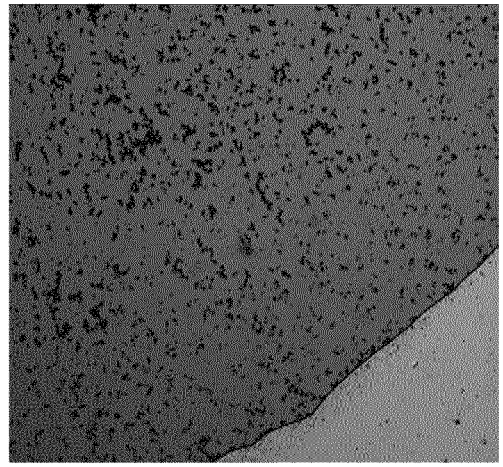
Solids by Microscope
Fig. 17 a. 50 wt.% HFPUO (3% Oxygen)/50 wt.% HSFO
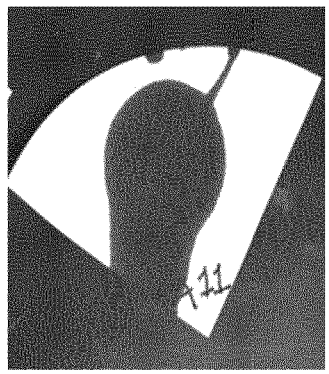 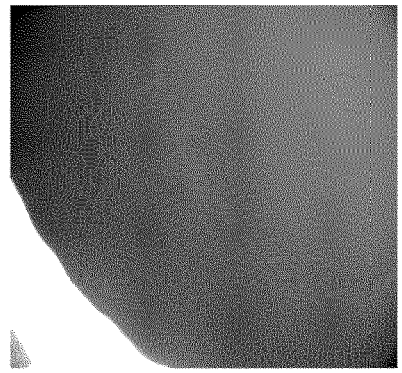 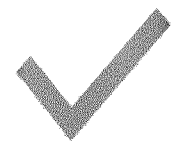
Compatible by spot test     Compatible by Microscope     Suitable for Marine blend stock
b. 25 wt.% HFPUO (3% Oxygen)/ 75 wt.% HSFO
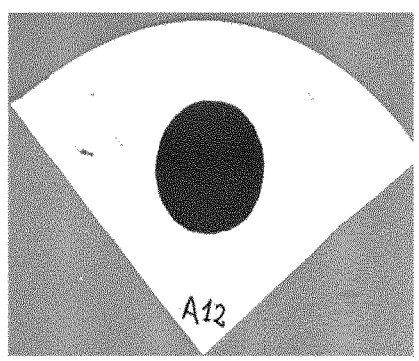 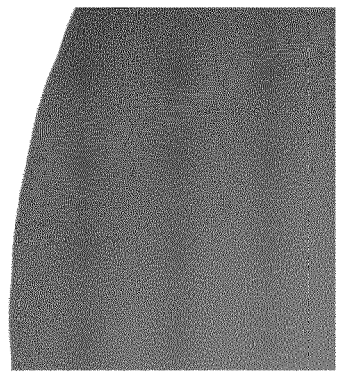 
spot test     Compatible by Microscope     Suitable for Marine blend stock
Fig. 18

BLEND OF HYDROCARBON CONTAINING FOSSIL AND RENEWABLE COMPONENTS AND METHOD FOR PRODUCING SUCH BLEND

FIELD OF THE INVENTION

The present invention relates to the area of hydrocarbon processing in a refinery and in particular to the area of processing hydrocarbon blends comprising a first blend component containing a renewable hydrocarbon component and a second blend component containing petroleum derived hydrocarbon to form at least part of a final hydrocarbon blend for processing in a refinery with enhanced efficiency.

BACKGROUND OF THE INVENTION

Climate changes has forced the international society to set up ambitious goals for reducing the total emissions of greenhouse gases to target a maximum temperature increase of 2° C. by 2050. About 25% of the total greenhouse gas emissions comes from transport, which despite gains in fuel efficiency is the only segment where emissions are still higher than the 1990 levels (i.e. heavy trucks, maritime and aviation) is the only segment where $CO_2$ emissions keep rising compared 1990 levels. Whereas emissions from light vehicles and buses can be reduced by improvements in fuel efficiency, electrification, hybrid cars, bioethanol, such options do not exist for heavy trucking, maritime and aviation, where emissions keep rising, and are predicted to continue to increase. Hence, new solutions are required for such transport applications.

Hydrothermal liquefaction (HTL) is a very efficient thermochemical method for conversion of biogenic materials such as biomass and waste streams into a renewable crude oil in high pressure water near the critical point of water (218 bar, 374° C.) e.g. at pressures from 150 bar to 400 bar and temperatures in the range 300 to 450° C. At these conditions water obtains special properties making it an ideal medium for many chemical reactions such as conversion of bio-organic materials into renewable crude oils. Hydrothermal liquefaction is very resource efficient due to its high conversion and carbon efficiency as all organic carbon material (including recalcitrant bio-polymers such as lignin) is directly converted to a renewable bio-crude oil. It has very high energy efficiency due to low parasitic losses, and, unlike other thermochemical processes no latent heat addition is required as there is no drying or phase change required i.e. wet materials can be processed. Furthermore hydrothermal liquefaction processes allows for extensive heat recovery processes. The renewable crude oil produced has many similarities with its petroleum counterparts and is generally of a much higher quality than e.g. biooils produced by pyrolysis that typically comprise significant amount of heteroatoms such oxygen (e.g. 40 wt %) as well as a high water content (e.g. 30-50 wt %) that makes such bio oils chemically unstable and immiscible in petroleum, and impose serious challenges for their upgrading and/or co-processing into finished products such as transportation fuels. Catalytic hydrodeoxygenation adopted from petroleum hydroprocessing has been proven to at least partly convert bio oils produced by pyrolysis to hydrocarbons or more stable bio oils, but has limitations related to very high hydrogen consumption due to the high oxygen content, catalyst stability and reactor fouling according to published studies e.g. Xing (2019), Pinheiro (2019), Mohan (2006), Elliott (2007).

The quantity and quality of the renewable crude oil produced by hydrothermal liquefaction depends on the specific operating conditions and hydrothermal liquefaction process applied e.g. parameters such as feed stock, dry matter content, pressure and temperature during heating and conversion, catalysts, presence of liquid organic compounds, heating- and cooling rates, separation system etc.

As for conventional petrochemical crude oils, the renewable crude oil produced from hydrothermal liquefaction processes needs to be upgraded/refined such as by catalytic hydrotreating and fractionation, before it can be used in its final applications e.g. direct use in the existing infrastructure as drop in fuels. However, despite that the renewable crude oils produced by hydrothermal liquefaction resembles its petroleum counter parts in many ways they also has its distinct properties including:

- High boiling point and viscosity due higher oxygen content than conventional petroleum oils
- Huge difference in boiling point with and without oxygen
- Higher oxygen content than petroleum derived oils results in higher exotherms during upgrading by e.g. catalytic hydrogenation due to higher oxygen content
- The renewable crude oil is not fully blendable/compatible with its petroleum counter parts nor with the partially or fully upgraded oil resulting from e.g. catalytic treatment with hydrogen.

These distinct properties needs to be taken into account both during operation of the hydrothermal production process, the direct use of the renewable crude oil or fractions thereof, and in the upgrading process no matter if it is performed by upgrading the renewable crude oil separately or by co-processing it with other oils such as conventional petroleum derived oils or other oils at refineries.

For use of the oil or fractions thereof in blends such as refinery input streams, either before refinery entry or at a later stage during the refinery process, comprising blends of fossil hydrocarbons as well as hydrocarbons containing a renewable component, it is critical that all components are fully compatible e.g. do not separate during use, storage and/or by dilution with other fuel blends for use in the same application.

Though such compatibility and improved efficiency and processability is desirable it is typically not obtained for oils comprising a renewable component.

One way of improving the compatibility of the renewable crude oil with the fossil counterpart is to deoxygenate the renewable crude oil through hydrogenation in cases where the oxygen content is high. This will improve the compatibility but is a very expensive way of achieving the increase in miscibility.

From Energy & Fuels 2019, 33, p. 11135-11144, (Ying et al), it appears on page 11135 that bio-oils obtained from a fast pyrolysis process are problematic in terms of co-processing with petroleum due to their immiscibility and very high oxygen content and that this has changed the focus towards HTL derived bio crude.

From US patent application 2013/0174476 it is known to produce a bio-oil composition comprising a biomass-derived liquid, at least one petroleum-derived composition and optionally one or more additives to produce a fungible bio-oil composition. The biomass-derived liquid is in this previously known technology a pyrolysis oil, which will have the disadvantages as described above and further have a high content of water. In the process a significant amount of residue is produced that reduces the efficiency of the process significantly.

For process and resource efficiency reasons as well as economic reasons, it is desirable that as much as possible of the renewable crude oil is converted into useful and valuable products that can be directly used or further processed in the same, and with a minimum of low value residues or waste products generated.

OBJECTIVE OF THE INVENTION

The objective of the present invention is to therefore provide a hydrocarbon blend comprising a petroleum component as well as a renewable component, not suffering from the efficiency and compatibility issues describes above and where a minimum of waste or residues are produced.

DESCRIPTION OF THE INVENTION

According to one aspect of the invention the objective is achieved through a hydrocarbon blend for input to a refinery and comprising a first blend component containing a renewable hydrocarbon component and a second blend component containing petroleum derived hydrocarbon to form at least part of a final hydrocarbon blend for processing in a refinery where the first blend component is characterized by comprising a hydrocarbon substance with at least 70% by weight having a boiling point above 220° C. and by having the characteristics $(\delta_{d1}, \delta_{p1}, \delta_{h1})=(17$-$20, 6$-$12, 6$-$12)$ and; where the second blend component is characterised by having the characteristics $(\delta_{d2}, \delta_{p2}, \delta_{h2})=(17$-$20, 3$-$5, 4$-$7)$, where the first blend component is present in the final hydrocarbon blend in a relative amount of up to 80 wt %.

By providing the first blend component as specified a minimum of residues are resulting from the hydrocarbon blend and hence an increased efficiency is achieved.

In an embodiment the first blend component comprises a hydrocarbon substance characterised by having the characteristics $(\delta_d, \delta_p, \delta_h)=(17$-$20, 6$-$15, 6$-$12)$; and a linker characterised by having the characteristics $(\delta_{d3}, \delta_{p3}, \delta_{h3})=(17$-$20, 3$-$6, 4$-$6)$; where the hydrocarbon substance is present in the first blend component in a relative amount of 90-99.5 wt. %, and, the linker substance is present in the first blend component in a relative amount of 0.5 to 10 wt. %.

In an embodiment the linker substance is an oil with a sulphur content of at least 1% by weight, such as a sulphur content of at least 1.5% by weight, preferably an oil having a sulphur content of at least 2.0% by weight.

In an embodiment the first blend component containing renewable hydrocarbon component(-s) comprises a hydrocarbon substance having at least 70% by weight with a boiling point above 300° C. such as at least 70% by weight having a boiling point above 350° C.; preferably the hydrocarbon substance of the first blend component comprises at least 70% by weight having a boiling point above 370° C. such as at least 70% by weight of the first component having a boiling point above 400° C.

In an embodiment the first blend component containing renewable hydrocarbon component(-s) comprises a hydrocarbon substance having at least 50% by weight with a boiling point above 300° C. such as at least 50% by weight of the hydrocarbon substance having a boiling point above 350° C.; preferably the first blend component comprises a hydrocarbon substance having at least 50% by weight with a boiling point above 370° C., such as a first blend component comprising a hydrocarbon substance having at least 50% by weight of the first blend component with a boiling point above 400° C.

In an embodiment the first blend component containing renewable hydrocarbon component(-s) comprises a hydrocarbon substance having at least 10% by weight with a boiling point above 400° C. such as at least 10% by weight having a boiling point above 450° C.;

In an embodiment the first blend component is present in the final hydrocarbon blend in a relative amount of up between 10-75 wt. %, where the second blend component is present in the final hydrocarbon blend in a relative amount of between 25-90 wt. %.

In an embodiment the first blend component containing renewable hydrocarbon component(-s) comprises a hydrocarbon substance having a water content of less than 1% by weight, such as water content of less than 0.5% by weight; preferably the first blend component containing renewable hydrocarbon component(-s) comprises a hydrocarbon substance having a water content of less than 0.25% by weight such as a water content of less than 0.1 wt %.

In an embodiment the first blend component is characterised by having the characteristics $(\delta_{d1}, \delta_{p1}, \delta_{h1})=(17$-$20, 7$-$12, 7$-$12)$;

In an embodiment the first blend component is characterised by having the characteristics $(\delta_{d1}, \delta_{p1}, \delta_{h1})=(17$-$20, 7$-$9, 8.5$-$10)$;

In an embodiment the hydrocarbon substance in the first blend component comprising renewable component(-s) is characterised by having the characteristics $(\delta_d, \delta_p, \delta_h)=(18.0$-$19, 5, 6$-$12, 7$-$10)$ and where the linker substance is characterised by having the characteristics ranges $(\delta_{d3}, \delta_{p3}, \delta_{h3})=(17$-$20, 4$-$6, 4$-$7)$.

In an embodiment the first blend component is present in the final hydrocarbon blend in a relative amount of between 50-75 wt. %, where the second blend component is present in the final hydrocarbon blend in a relative amount of between 25-50 wt. %, and where further the linker substance optionally is present in the final hydrocarbon blend in a relative amount of between 0.5 to 5 wt. %.

In an embodiment the linker substance comprises one or more components selected from each of the groups 1. Ketones, 2. Alcohols 3. Alkanes, 4. Aromatics such as toluene, xylene, cresol.

In an embodiment the linker substance comprises or further comprises 25-90% by weight of ketones, 0.1-40% by weight of alkanes, 1-40% by weight of alcohols and 0.1-20% by weight of toluene and/or xylene and/or creosol.

In an embodiment the viscosity of the hydrocarbon blend at 50° C. is in the range 160-180 cSt, the flashpoint of the hydrocarbon blend above 60° C., the pour point of the hydrocarbon blend is less than 30° C., and the total acid number (TAN) is less than 2.5 mg KOH/g.

In an embodiment the first blend component and/or the hydrocarbon substance is further characterized by having a Conradson Carbon Residue number of less than 25.

In an embodiment the first blend component and/or the hydrocarbon substance is further characterized by having a TAN of less than 50 mg KOH/g such as less than 40 mg KOH/g, preferably the first blend component and/or the hydrocarbon substance is further characterized by having a total acid number (TAN) of less than 30 mg KOH/g such as less than 20 mg KOH/g In an embodiment the first blend component and/or the hydrocarbon substance is further characterized by:
a flash point in the range 60 to 150° C.,
a pour point below 30° C.,
an ash content of less than 0.1% by weight,
a Conradson Carbon Residue number of less than 20,
an acid number of less than 2.5 mg KOH/g In an embodiment the hydrocarbon substances of the first blend component is further characterized by having an oxygen content of less than 15% by weight such as an oxygen content of less than 12% by weight; preferably the first blend component is further characterized by having an oxygen content of less than 10% by weight such as an oxygen content of less than 8% by weight.

In an embodiment the first blend component and/or hydrocarbon substance has an oxygen content of less than 5% by weight such as less than 3% by weight.

In an embodiment the first blend component is further characterized by having a viscosity at 50° C. in the range of 1000-10000 cSt such as a viscosity at 50° C. in the range 100-1000 cSt.

In an embodiment the hydrocarbon substance of the first blend component is produced from biomass and/or waste.

In an embodiment the production of the hydrocarbon substance of the first blend component is performed by a hydrothermal liquefaction process.

In an embodiment the hydrocarbon substance of the first blend component is produced by:
 a. Providing one or more biomass and/or waste materials contained in one or more feedstock;
 b. Providing a feed mixture by slurrying the biomass and/or waste material(-s) in one or more fluids at least one of which comprises water;
 c. Pressurizing the feed mixture to a pressure in the range 100 to 400 bar;
 d. Heating the pressurized feed to a temperature in the range 300° C. to 450° C.;
 e. Maintaining the pressurized and heated feed mixture in a reaction zone in a reaction zone for a conversion time of 3 to 30 minutes.
 f. cooling the converted feed mixture to a temperature in the range 25° C. to 200° C.
 g. Expanding the converted feed mixture to a pressure of 1 to 120 bar;
 h. Separating the converted feed mixture into a crude oil, a gas phase and a water phase comprising water soluble organics and dissolved salts
 i. Optionally further upgrading the crude oil by reacting it with hydrogen in the presence of one or more heterogeneous catalysts in one or more steps at a pressure in the range 60 to 200 bar and a temperature of 260 to 400° C.; and separating the upgraded crude oil into a fraction comprising low boiling compounds and a first blend component comprising high boiling compounds.

In a further aspect of the invention the objective is achieved through an intermediate blend component for forming a hydrocarbon blend according to any of the preceding claims, the intermediate blend component comprising a hydrocarbon substance containing hydrocarbon and a linker substance to form at least part of the intermediate blend component, where the hydrocarbon substance is characterised by having the characteristics $(\delta_{d1}, \delta_{p1}, \delta_{h1})=(17\text{-}20, 6\text{-}12, 7\text{-}10)$ and where the linker substance is characterised by having the characteristics $(\delta_{d3}, \delta_{p3}, \delta_{h3})=(17\text{-}20, 3\text{-}6, 3\text{-}6)$; where the hydrocarbon substance is present in the intermediate blend component in a relative amount of between 90-99.5 wt. % and where further the linker substance is present in the intermediate blend component in a relative amount of between 0.5 to 10 wt. %.

In an embodiment the hydrocarbon substance is present in the intermediate blend component in a relative amount of up between 95-99.5 wt. % and where further the linker substance is present in the intermediate blend component in a relative amount of up between 0.5 to 5 wt. %.

In a still further aspect of the invention the objective is achieved through a method of producing a hydrocarbon blend containing a renewable component according to any of the preceding claims, where the method comprises the steps of:
 Providing a first blend component comprising a renewable component characterized by having the characteristics $(\delta_{d1}, \delta_{p1}, \delta_{h1})=(17\text{-}20, 6\text{-}10, 6\text{-}10)$ in an amount of up to 80% by weight of the final hydrocarbon blend;
 Providing a second blend component characterised by having the characteristics $(\delta_{d2}, \delta_{p2}, \delta_{h2})=(17\text{-}20, 3\text{-}6, 3\text{-}6)$
 Adding the first blend component to the second blend component to form the hydrocarbon blend.

In an embodiment the method further comprises the steps of:
 Providing a linker substance having the characteristics $(\delta_{d3}, \delta_{p3}, \delta_{h3})=(17\text{-}20, 3\text{-}6, 3\text{-}6)$ in a relative amount of between 0.5 to 10 wt. % of the final hydrocarbon blend;
 Adding the linker substance to the first or to the second blend component to form an intermediate blend component;
 Adding the second or the first blend component to the intermediate blend component to form the hydrocarbon blend.

In an embodiment the first blend component and/or the second blend component and/or the intermediate blend component is heated to a temperature in the range 70-150° C. prior to forming the hydrocarbon blend.

In an embodiment the intermediate blend component comprising the first or the second blend component and the linker substance is manipulated to form a homogenous mixture prior to adding the second or the first blend component to form the hydrocarbon blend.

In an embodiment the manipulation to form a homogenous mixture is carried by stirring the mixture or by pumping the mixture.

In a further aspect of the invention the objective is achieved through a method for preparing the production of a hydrocarbon blend according to any of the preceding claims, the method comprising measuring the characteristics $(\delta_{d1}, \delta_{p1}, \delta_{h1})$ of a first blend component containing a renewable hydrocarbon component, measuring the characteristics $(\delta_{d2}, \delta_{p2}, \delta_{h2})$ of a second blend component, determining the compatibility of the first and the second blend component based on the measurement of the characteristics.

In an embodiment the compatibility is determined to be present based on the measured characteristics and the first and the second blend components are accepted for direct mixing.

In an embodiment the first and the second blend component are determined to be incompatible based on the measured characteristics, where a linker substance is selected having characteristics $((\delta_{d3}, \delta_{p3}, \delta_{h3}))$ and where the linker substance is added to the first or the second blend component to achieve compatibility.

BRIEF DESCRIPTION OF THE DRAWINGS

The invention will be described in the following with reference to one embodiment illustrated in the drawings where:

FIG. 7 shows photos of spot tests for evaluation of solubility. (1) shows two solvents being fully soluble and (2) shows two solvents which are partially soluble.

FIG. 9a and FIG. 9b. summarizes the solvents and solvent mixtures to determine the Hansen Solubility Parameters used to estimate the Hansen Solubility Parameters of Renewable Crude Oils produced in example 1.

FIG. 10. Summarizes the properties of renewable liquids produced by hydrothermal liquefaction and upgrading process.

FIG. 14. summarizes the Hansen Solubility Parameters for different Renewable liquids, fossil oils, VGO and bitumen.

FIG. 16. shows an example of a low sulphur fuel blend containing a renewable component according to a preferred embodiment of the invention.

FIG. 17. shows spot test and microscope images of blends between Partially Upgraded Heavy Fraction (HFPUO) and Marine Gas Oil (MGO) described in example 14

FIG. 18 shows spot test and microscope images of blends between Partially Upgraded Heavy Fraction (HFPUO) and High Sulphur Fuel oil (HSFO) describe in example 15

DESCRIPTION OF A PREFERRED EMBODIMENT

Figure 1:
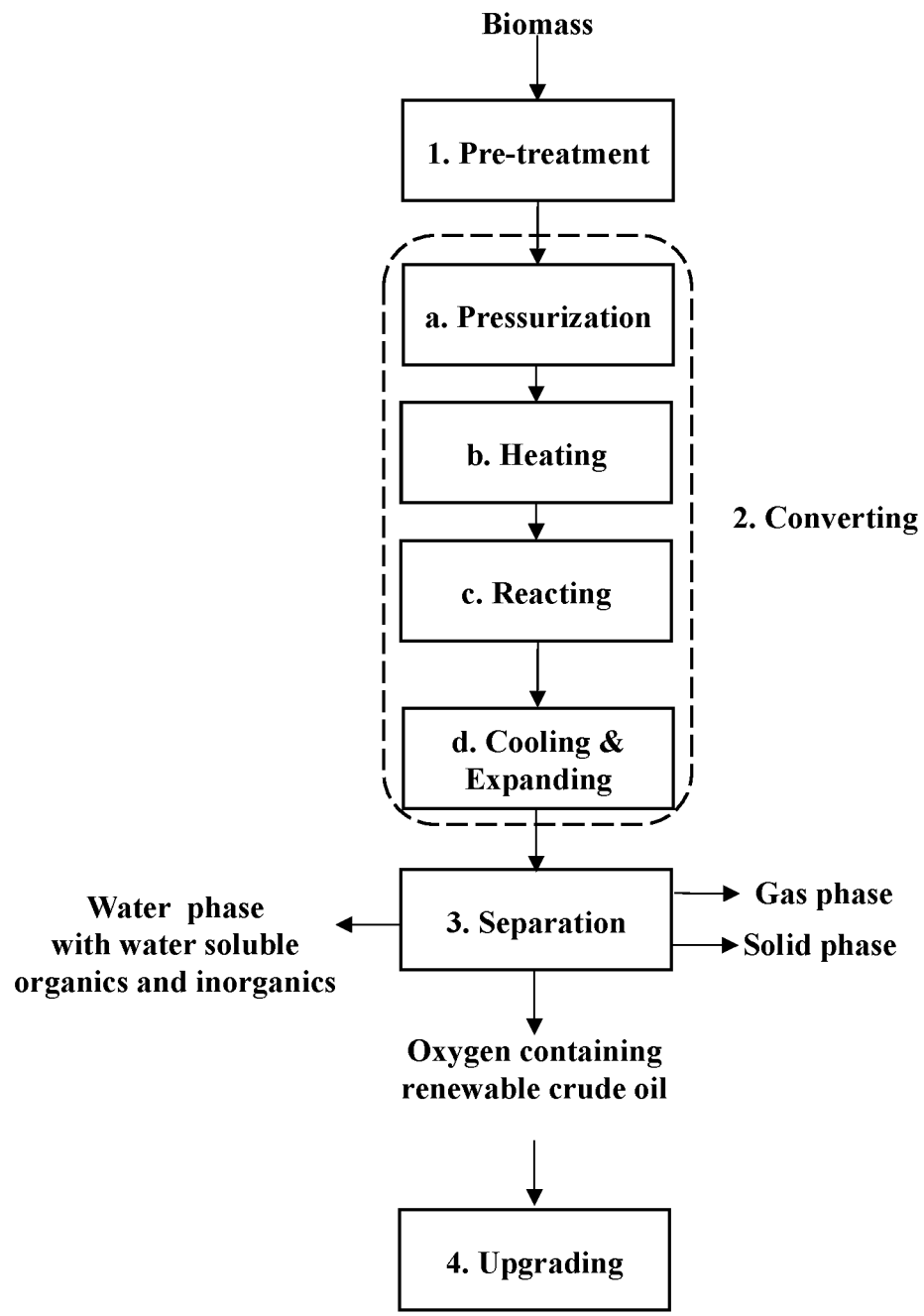
FIG. 1 shows a schematic overview of a continuous high pressure process for transforming carbonaceous materials into renewable hydrocarbons.
Figure 2:
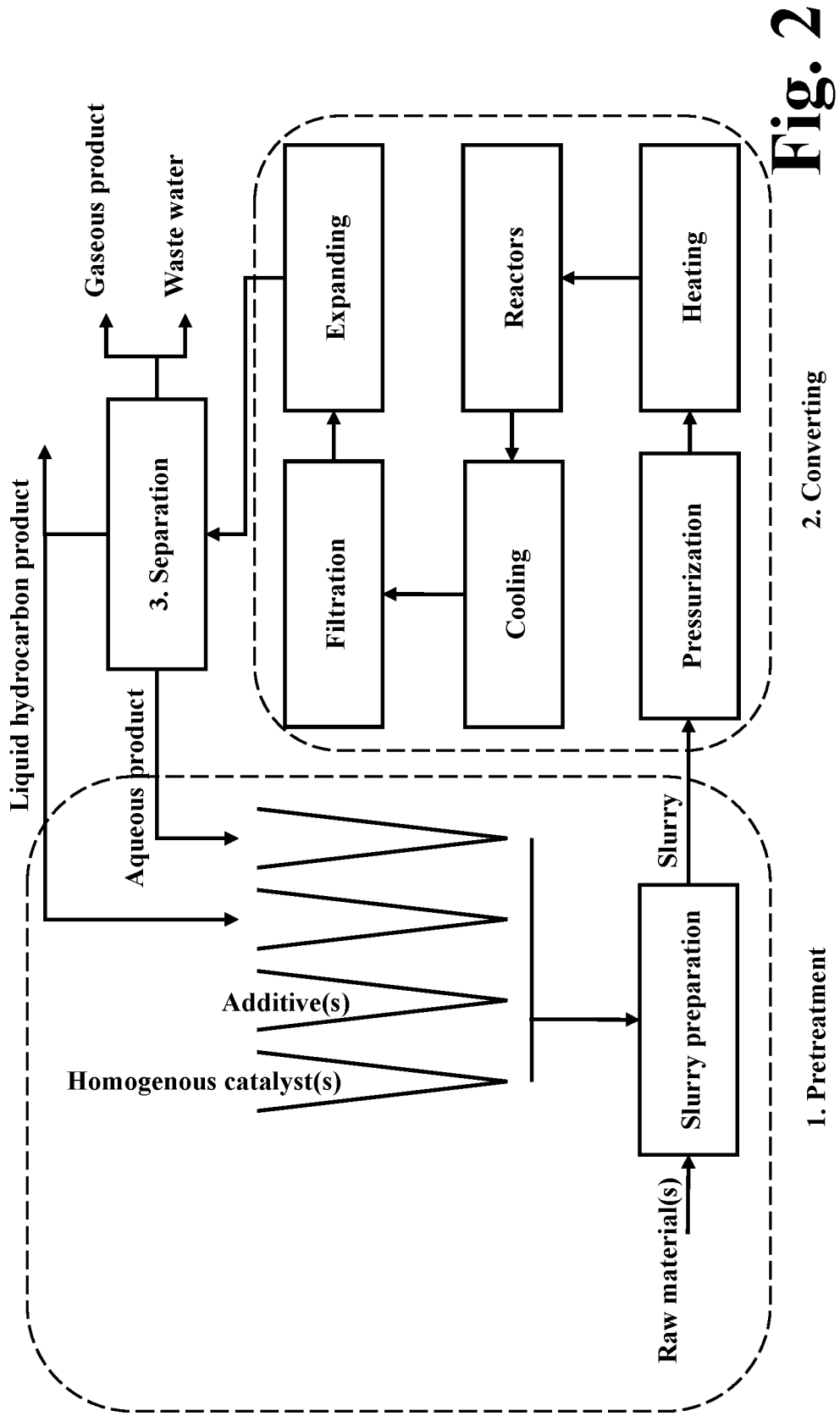
FIG. 2 shows a process flow diagram of the plant used to produce the oil in example 1.

FIG. 1 shows an embodiment of a continuous high pressure production process for conversion of carbonaceous materials such as biomass and/or waste to renewable oil.

As shown in FIG. 1, a carbonaceous material in the form of biomass and/or waste material is first subjected to a feed mixture preparation step (1). The feed mixture preparation step transforms the carbonaceous material into a pumpable feed mixture and often includes mechanical means for size reduction of the carbonaceous and slurrying the carbonaceous material with other ingredients such as water, catalysts and other additives such as organics in the feed mixture. In a preferred embodiment of the present invention, the feed mixture may be preheated in the pretreatment step. Often the feed mixture is preheated to a temperature in the range from about 100° C. to about 250° C. in the pretreatment step.

Non limiting examples of biomass and waste according to the present invention include biomass and wastes such as woody biomass and residues such as wood chips, saw dust, forestry thinnings, road cuttings, bark, branches, garden and park wastes and weeds, energy crops like coppice, willow, *miscanthus*, and giant reed; agricultural and byproducts such as grasses, straw, stems, stover, husk, cobs and shells from e.g. wheat, rye, corn rice, sunflowers; empty fruit bunches from palm oil production, palm oil manufacturers effluent (POME), residues from sugar production such as bagasse, vinasses, molasses, greenhouse wastes; energy crops like *miscanthus*, switch grass, sorghum, jatropha; aquatic biomass such as macroalgae, microalgae, cyano bacteria; animal beddings and manures such as the fiber fraction from livestock production; municipal and industrial waste streams such as black liquor, paper sludges, off spec fibres from paper production; residues and byproducts from food production such as pomace from juice, vegetable oil or wine production, used coffee grounds; municipal solid waste such as the biogenic part of municipal solid waste, sorted household wastes, restaurant wastes, slaughter house waste, sewage sludges such as primary sludges, secondary sludges from waste water treatment, digestates from anaerobic digestion and combinations thereof. Many carbonaceous materials according to the present invention are related to lignocellulose materials such as woody biomass and agricultural residues. Such carbonaceous materials generally comprise lignin, cellulose and hemicellulose.

An embodiment of the present invention includes a carbonaceous material having a lignin content in the range 1.0 to 60 wt. % such as lignin content in the range 10 to 55 wt. %. Preferably the lignin content of the carbonaceous material is in the range 15 to 40 wt. % such as 20-40 wt. %.

The cellulose content of the carbonaceous material is preferably in the range 10 to 60 wt. % such as cellulose content in the range 15 to 45 wt. %. Preferably the cellulose content of the carbonaceous material is in the range 20 to 40 wt. % such as 30-40 wt. %.

The hemicellulose content of the carbonaceous material is preferably in the range 10 to 60 wt. % such as cellulose content in the range 15 to 45 wt. %. Preferably the cellulose content of the carbonaceous material is in the range to 40 wt. % such as 30-40 wt. %.

The second step is a pressurization step (2) where the feed mixture is pressurized by pumping means to a pressure of at least 150 bar and up to about 450 bar.

The pressurized feed mixture is subsequently heated to a reaction temperature in the range from about 300° C. and up to about 450° C.

The feed mixture is generally maintained at these conditions in sufficient time for conversion of the carbonaceous material e.g. for a period of 2 to 30 minutes before it is cooled and the pressure is reduced.

The product mixture comprising liquid hydrocarbon product, water with water soluble organics and dissolved salts, gas comprising carbon dioxide, hydrogen, and methane as well as suspended particles from said converted carbonaceous material is subsequently cooled to a temperature in the range 50° C. to 250° C. in one or more steps.

The cooled or partly cooled product mixture thereafter enters a pressure reducing device, where the pressure is reduced from the conversion pressure to a pressure of less than 200 bar such as a pressure of less than 120 bar.

Suitable pressure reduction devices include pressure reduction devices comprising a number of tubular members in a series and/or parallel arrangement with a length and internal cross section adapted to reduce the pressure to desired level, and pressure reducing devices comprising pressure reducing pump units.

The converted feed mixture is further separated into at least a gas phase comprising carbon dioxide, hydrogen, carbon monoxide, methane and other short hydrocarbons ($C_2$-$C_4$), alcohols and ketones, a crude oil phase, a water phase with water soluble organic compounds as well as dissolved salts and eventually suspended particles such as inorganics and/or char and/or unconverted carbonaceous material depending on the specific carbonaceous material being processed and the specific processing conditions.

The water phase from the first separator typically contains dissolved salts such as homogeneous catalyst(-s) such as potassium and sodium as well as water soluble organic compounds. Many embodiments of continuous high pressure processing of carbonaceous material to hydrocarbons according to the present invention include a recovery step for recovering homogeneous catalyst(-s) and/or water soluble organics from said separated water phase, and at least partly recycling these to the feed mixture preparation step. Hereby the overall oil yield and energy efficiency of the process is increased.

A preferred embodiment according to the present invention is where the recovery unit comprises an evaporation and/or distillation step, where the heat for the evaporation and/or distillation is at least partly supplied by transferring heat from the high pressure water cooler via a heat transfer medium such as a hot oil or steam, whereby the overall heat recovery and/or energy efficiency is increased.

The renewable crude oil may further be subjected to an upgrading process (not shown) where it is pressurized to a pressure in the range from about 20 bar to about 200 bar such as a pressure in the range 50 to 120 bar, before being heated to a temperature in the range 300 to 400° C. in one or more steps and contacted with hydrogen and heterogeneous catalyst(s) contained in one or more reaction zones, and eventually fractionated into different boiling point fractions.

Example 1: Providing a First Blend Component Containing a Renewable Component According to a Preferred Embodiment of the Present Invention Three different renewable crude oils Oil A, Oil B, and Oil C was produced from Birch and Pine wood using the pilot plant in FIG. 1. The analysis of the wood chips as received is shown in Table 1 below.

TABLE 1

Composition of carbonaceous material on a dry ash free basis.

| Element | Spruce wt.-%, dry | Pine wt.-%, dry | 50/50 mixture |
|---|---|---|---|
| C, wt. % | 50.4 | 50.2 | 50.3 |
| H, wt. % | 6.1 | 6.2 | 6.15 |
| O, wt. % | 43.1 | 43.4 | 43.25 |
| S, wt. % | 0 | 0 | 0 |
| N, wt. % | 0.2 | 0.1 | 0.15 |
| Cl, wt. % | 0.008 | 0.007 | 0.0074 |
| HHV, MJ/kg | 20.2 | 20.1 | 20.15 |

Feed Preparation

The wood chips were sized reduced to wood flour in a hammer mill system and mixed with recycled water (inclusive dissolved salts and water soluble organics), recycled oil, catalysts to produce a homogeneous and pumpable feed mixture. Potassium carbonate was used as catalyst and sodium hydroxide was used for pH adjustment. It was attempted to keep the potassium concentration constant during the runs i.e. the potassium concentration in the water phase was measured and the required make-up catalyst concentration was determined on this basis. Sodium hydroxide was added in amounts sufficient to maintain the outlet pH of the separated water phase in the range 8.0-8.5. Further CMC (Carboxy Methyl Cellulose, $M_w$=30000) in a concentration of 0.8 wt. % was added to the feed slurry as a texturing agent to avoid sedimentation in the feed barrel and improve pumpability.

As neither water nor oil phases was available for the first cycle (batch), crude tall oil was used as start up oil and 5.0 wt. % ethanol and pure water (Reversed Osmosis water, RO water) was used to emulate the water phase in the first cycle. Multiple cycles (batches) are required before the process can be considered in steady state and representative oil and water phases are produced. Approximately 6 cycles are required to produce oil with less than 10% concentration of the start up oil. Hence, 6 cycles were carried out, where the oil and water phase produced from the previous cycle was added to the feed mixture for the subsequent cycle. The feed composition for the 6th cycle run is shown in Table 2 below:

TABLE 2

Feed mixture composition for $6_{th}$ cycle run.

| Pine wt. % dry | Spruce wt. % dry | CMC wt. % dry | Recirc. oil from $5_{th}$ cycle wt. % dry | Water contained in wood and recycled oil wt. % | Recirc. water phase from $5_{th}$ cycle wt. % | K wt. % | NaOH wt. % | Total wt. % |
|---|---|---|---|---|---|---|---|---|
| 11.1 | 11.1 | 0.8 | 18.2 | 9.8 | 45.2 | 2.3 | 1.5 | 100.0 |

The feed mixture in Table 2 were all processed at a pressure of about 320 bar and a temperature around 400° C. The de-gassed product was collected as separate mass balance samples (MB) in barrels from the start of each test, and numbered MB1, MB2, MB3, etc. The collected products were weighed, and the oil and water phases were gravimetrically separated and weighed. Data was logged both electronic and manually for each batch.

Total Mass Balance

The Total mass balance ($MB_{Tot}$) is the ratio between the total mass leaving the unit and the total mass entering the unit during a specific time. The total mass balance may also be seen as a quality parameter of the data generated. The average value is 100.8% with a standard deviation of
Oil Yield from Biomass (OY)

The Oil Yield from Biomass (OY) expresses the fraction of incoming dry biomass that is converted to dry ash free oil. It's defined as the mass of dry ash free Oil produced from dry biomass during a specific time divided by the mass of dry biomass entering the unit during the same time. The recirculated oil is not included in the balance, it's subtracted from the total amount of oil recovered when calculating the oil yield from biomass. The average oil yield (OY) was found to be 45.3 wt. % with a standard deviation of 4.1 wt. % i.e. 45.3% of the mass of dry biomass (wood+CMC) in the feed is converted to dry ash free Oil.

Detailed Oil Analysis

Data measured for the oil is presented in Table 3.

TABLE 3

Data for $6_{th}$ cycle oil

| Parameter | Unit | Whole Oil, (dehydrated) | Light fractions (180-260° C.) | Light fractions (260-344° C.) | Heavy fraction (344° C.) |
|---|---|---|---|---|---|
| Yield on Crude, wt % | | | 11.6 | 21.1 | |
| C | wt. % (daf) | 81.9 | 80.3 | 82.3 | 84.8 |
| H | wt. % (daf) | 8.7 | 10.3 | 9.5 | 8.0 |
| N | wt. % (daf) | 0.09 | n.a | n.a | <0.75 |
| S | wt. % (daf) | 0.008 | n.a | n.a | n.a |
| O | wt. % (daf) | 10.1 | 9.4 | 8.2 | 8.2 |
| Density, 15° C. (Whole Oil, a.r) | kg/l | 1.0729 | | | |
| Density, 15° C. | kg/l | n.a | 0.9425 | 1.0236 | 1.1541 |
| Density, 40° C. | kg/l | 1.0572 | | | |
| Density, 50° C. | kg/l | 1.0503 | | | |
| Density, 60° C. | kg/l | 1.0435 | | | |
| Density, 70° C. | kg/l | 1.0368 | | | |
| HHV (daf) | MJ/kg | 38.6 | 38.5 | 37.5 | 37.7 |
| Kinematic Viscosity, 40° C. | mm$^2$/s | 17360 | 2.996 | | 9812 (150° C.) |
| Kinematic Viscosity, 60° C. | mm$^2$/s | 1545 | | | 1298 (175° C.) |
| Total Acid Number | mg KOH/g | 8.8 | 3.75 | 8.2 | 8.2 |
| Strong Acid Number | mg KOH/g | <0.01 | | | |
| Pour point (maximum) | ° C. | 24 | −60 | −15 | 140 |
| Flash point | ° C. | 59 | 90 | 146 | |
| Moisture content | wt. % | 0.88 | | | |

Energy Recovery in the Produced Hydrofaction Oil

The Energy Recovery ($ER_{oil}$) expresses how much of the chemical energy in the fed wood that are recovered in the oil. It does not take into account the energy required for heating nor the electrical energy supplied to the unit. For the calculations of recoveries, a High Heating Value (HHV) for the oil of 38.6 MJ/kg were used together with the HHV for the wood mixture given in Table 1. The resulting energy recovery for the $6_{th}$ cycle oil was 85.6% with a standard deviation of 7.7 i.e 85.6% of the (chemical) energy in wood fed to the plant is recovered in the produced oil.

Gas Production and Gas Analyses

Gas is produced in the process of converting biomass into oil. The yield of gas produced from dry wood in the feed is 41.2 wt. %. The gas is composed of mainly $CO_2$, $CH_4$ and other short hydrocarbons ($C_2$-$C_4$), $H_2$ and some lower alcohols. Gas was sampled and analyzed by Sveriges Tekniska Forskningsinstitut (SP) in Sweden. The analysis of $6_{th}$ cycle gas is shown in Table 4 along with heating values of the gas estimated from the gas composition. Since a HTL process runs at reductive conditions, it's assumed that the gas is oxygen ($O_2$) free and the detected oxygen in the gas origin from air leaking into the sample bags when filled with gas sample. The gas composition is corrected for the oxygen (and nitrogen). The calculated elemental composition of the gas is shown in Table 4.

TABLE 4

Gas composition for the gas produced in the process.

| Component | Vol. %, a.r | Vol. %, air free* | wt. %, air free | HHV, MJ/kG | LHV, MJ/kG |
|---|---|---|---|---|---|
| $H_2$ | 24.00 | 25.79 | 1.69 | 2.40 | 2.02 |
| $O_2$* | 0.40 | 0.0 | 0.0 | 0.0 | 0.0 |
| $N_2$ | 1.50 | 0.02 | 0.01 | 0.00 | 0.00 |
| $CO_2$ | 56.90 | 61.14 | 87.27 | 0.00 | 0.00 |
| CO | 0.30 | 0.32 | 0.29 | 0.03 | 0.03 |

TABLE 4-continued

Gas composition for the gas produced in the process.

| Component | Vol. %, a.r | Vol. %, air free* | wt. %, air free | HHV, MJ/kG | LHV, MJ/kG |
|---|---|---|---|---|---|
| $CH_4$ | 6.70 | 7.20 | 3.75 | 2.08 | 1.87 |
| Ethene | 0.16 | 0.17 | 0.16 | 0.08 | 0.07 |
| Ethane | 2.20 | 2.36 | 2.31 | 1.20 | 1.10 |
| Propene | 0.27 | 0.29 | 0.40 | 0.19 | 0.18 |
| Propane | 0.95 | 1.02 | 1.46 | 0.74 | 0.68 |
| Sum $C_4$ | 0.63 | 0.68 | 1.25 | 0.62 | 0.57 |
| Methanol | 0.41 | 0.44 | 0.46 | 0.10 | 0.09 |
| Ethanol | 0.27 | 0.29 | 0.43 | 0.13 | 0.12 |
| Acetone | 0.26 | 0.28 | 0.53 | 0.17 | 0.15 |
| Total | 94.95 | 100 | 100 | 7.73 | 6.89 |

Oxygen ($O_2$) in the as received gas (a.r) is assumed to origin from air contamination of the gas when filling the sample bag. The produced gas composition is assumed air (Oxygen) free.

TABLE 5

Elemental gas composition.

| Element | wt. % |
|---|---|
| C | 32.0 |
| H | 3.8 |
| N | 0.0 |
| O | 64.1 |
| Total | 100 |

* MEK free basis

Figure 3:
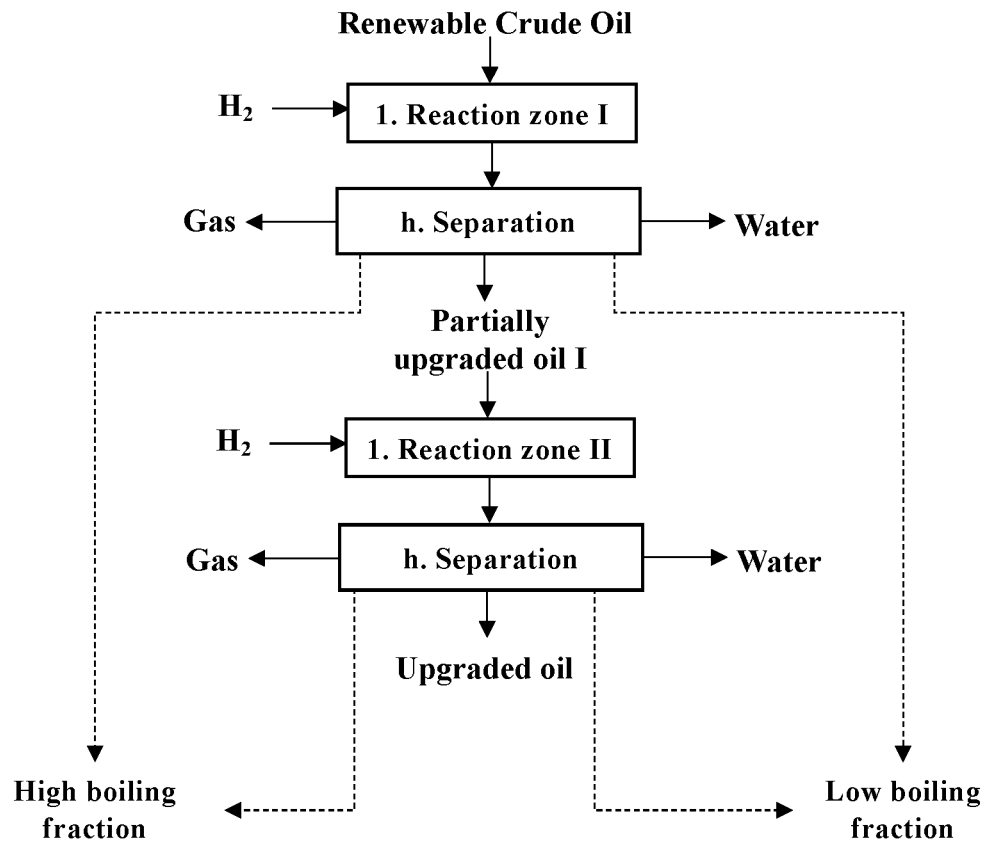
FIG. 3 shows a schematic overview of a catalytic upgrading process for producing a partially upgraded renewable oil in example 2.
Figure 4:
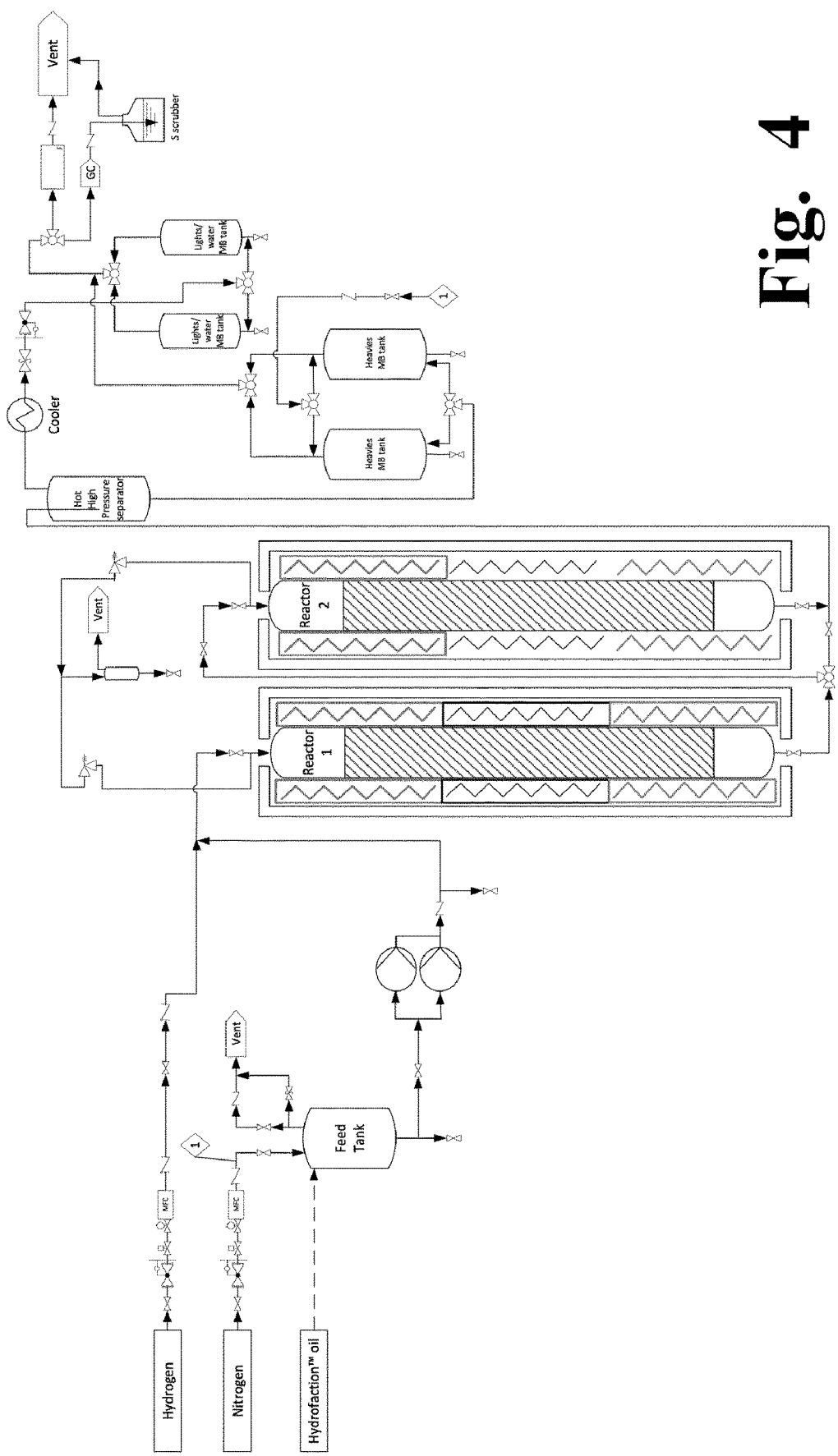
FIG. 4 shows a schematic flow diagram of the unit used for upgrading the renewable crude oil in example 2 and 3.

Example 2: Providing a First Blend Component Containing a Renewable Component by Upgrading of Renewable Crude Oil Renewable crude oil—Oil A, B and C—produced from pine wood as described in example 1 was subjected to a partial upgrading by hydroprocessing as shown in FIG. 3.

The process was carried out in a continuous pilot-plant unit, using a down-flow tubular reactor. Three independent heating zones where used to ensure and isothermal profile in the catalysts bed. Therefore, the reactor allocates three sections including pre-heating zone, catalysts bed (isothermal zone) and outlet zone. The reactor was filled with a 25% to 50% degraded catalyst with silicon carbide inert material. A commercial NiMo—S catalyst was used.

The catalysts bed was first dried in a nitrogen atmosphere at temperatures in the range of 100–130° C., and subsequently activated by a pre-sulfiding process using sulphur-spiked diesel with 2.5 wt. % of Dimethyl Disulfide and hydrogen flow rate of 24 L/hr at 45 bar and temperature between 25 to 320° C. (35/h rate) for about 40 hours or until sulphur saturation levels were off, i.e. until the hyperactivity of the catalyst wears off. This was monitored via sulphur product saturation or change in liquid gravity; once the product gravity was stable, the renewable crude oil was introduced to the system at the desired flow.

The weight hour space velocity (WHSV) was varied in the range 0.2 to 0.5 $h_{-1}$, at a constant flow of hydrogen (900 scc $H_2$/cc of oil), operating pressure of 90 bar and the operation temperature of the isothermal zone containing the heterogeneous catalyst was 320° C.

The resulting partially upgraded oil quality had the following properties (table 6).

The results presented in table 6 indicate that decreasing the space velocity the water increases while the viscosity, oxygen content and TAN are reduced. This effect is related to higher reactions rated of decarboxylation/methanation and hydrodeoxygenation/dehydration reactions.

Example 3: Providing a First Blend Component Containing a Renewable Component by Further Upgrading of Partially Upgraded Oil Partially upgraded oil produces as described in example 2 was subjected to a further stage of hydro-processing as shown in FIG. 3.

The process was carried out in a continuous pilot-plant unit, using a down-flow tubular reactor. Three independent heating zones where used to ensure and isothermal profile in the catalysts bed. Therefore, the reactor allocates three sections including pre-heating zone, catalysts bed (isothermal zone) and outlet zone. The reactor was filled with a 50% degraded catalyst with silicon carbide inert material. A commercial NiMo—S catalyst was used.

The catalysts bed was first dried in a nitrogen atmosphere at temperatures in the range of 100-130° C., and subsequently activated by a pre-sulfiding process using sulphur-spiked diesel with 2.5 wt. % of Dimethyl Disulfide and hydrogen flow rate of 24 L/hr at 45 bar and temperature between 25 to 320° C. (35/h rate) for about 40 hours or until sulphur saturation levels were off, i.e. until the hyperactivity of the catalyst wears off. This was monitored via sulphur product saturation or change in liquid gravity; once the product gravity was stable, the renewable crude oil was introduced to the system at the desired flow.

The weight hour space velocity (WHSV) was 0.3, at a constant flow of hydrogen (1300 scc $H_2$/cc of oil), operating pressure of 120 bar and operation temperature of the isothermal zone containing the heterogeneous catalyst was 370° C. A significant reduction of boiling point and residue is obtained after hydroprocessing the partially upgraded oil as shown in Table 7. i.e. the fraction from the initial boiling point (IBP) to 350° C. is more than doubled by the upgrading process, and the residue (BP>550° C.) was reduced from 16.3.% to 7.9%.

TABLE 6

Physicochemical properties of renewable crude oil and partially upgraded oil

| | RENEWABLE CRUDE OIL | PARTIALLY UPGRADED OIL I | PARTIALLY UPGRADED OIL II | PARTIALLY UPGRADED OIL III |
|---|---|---|---|---|
| Reaction WHSV [$h_{-1}$] | — | 0.5 | 0.3 | 0.2 |
| TAN [mg KOH/g oil] | 62 | 14.7 | 5.6 | 4.3 |
| Density @ 15.6° C. [kg/m3] | 1051.1 | 987.3 | 972.2 | 962.3 |
| viscosity @ 40° C. [cP] | 1146 | 160 | 74 | 48 |
| H/C | 1.41 | 1.50 | 1.57 | 1.61 |
| Oxygen [wt. %] | 9.5 | 6.3 | 2.4 | 2.1 |
| HHV [MJ/kg] | 37.6 | 41.3 | 42.0 | 42.4 |
| Water yield [wt. %] | — | 6.27 | 6.69 | 7.37 |

TABLE 7

Physicochemical properties of renewable crude oil and partially upgraded oil

|  | PARTIALLY UPGRADED OIL I | UPGRADED OIL |
|---|---|---|
| Reaction WHSV [h$_{-1}$] | — | 0.3 |
| TAN [mg KOH/ g oil] | 14.7 | <0.1 |
| Density @ 15.6° C. [kg/m$_3$] | 926 | 903 |
| H/C | 1.64 | 1.73 |
| Oxygen [wt. %] | 0.6 | 0.0 |
| HHV [MJ/kg] | 43.9 | 44.3 |
| Water yield [wt. %] | 9.7 | 0.1 |
| IBP-350° C. distillate [%] | 64 | 67 |
| Residue >550° C. | 16.3 | 7.9 |

Figure 5:
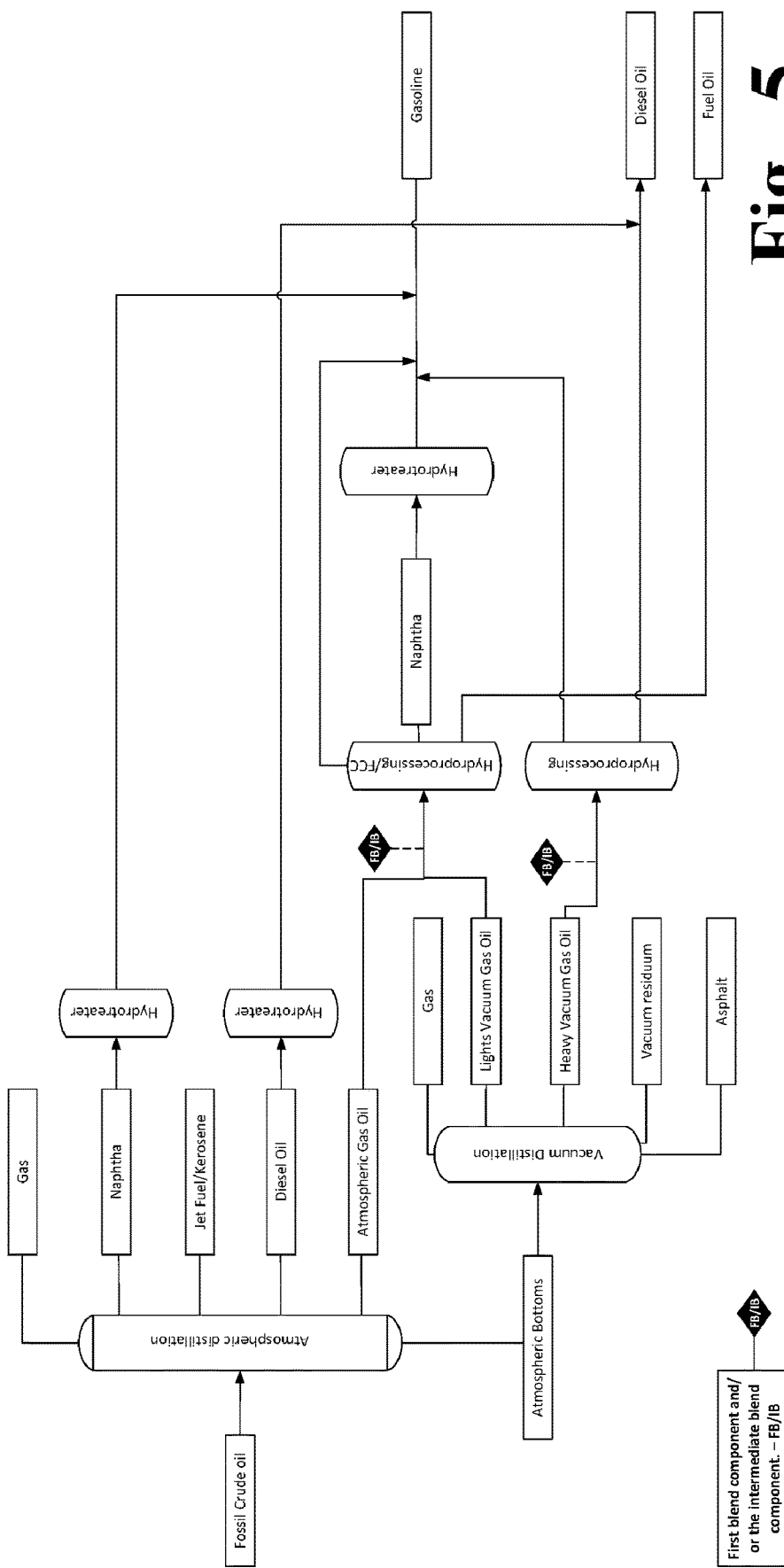
FIG. 5 shows a schematic refinery process diagram with potential drop in points for the first blend component and/or the intermediate blend component.

Example 4 Refinery Process and Potential Blending Points for First and Intermediate Blend Components A conventional refinery process contains several hydroprocessing steps and separations to ensure high yields of fuels and maximum fossil oil utilization. FIG. 5 shows a simplified conventional refinery process where the petroleum crude oil is first fractionated into Naphtha, Jet fuel/kerosene, Diesel oil, atmospheric gas oil and atmospheric bottoms by atmospheric distillation. Each of those fractions are submitted to further hydroprocessing stages as needed to ensure fuel spec compliance. It is desirable to utilize existing infrastructure to co-process the first fuel blend component containing renewable hydrocarbon with the second blend component comprising a refinery stream i.e. co-processing at existing refineries for pretroleum oil.

Several potential drop in points at the refinery exist. In all cases, compatibility of the first blend component is critical to ensure smooth refinery operation during co-processing, e.g. blend components should not separate during use, storage and/or by dilution with other blends for use in the same application. It has been shown in the prior art that specific fractions (distillates) of renewable crude oils (hydrocarbon substance in the present context) can be co-processed with certain petroleum fractions (second blend component) at least in relatively small blending ratios with acceptable catalyst deactivation rates e.g. Ying (2019). However, the prior art co-processing methodologies typically also generate significant amount of residues. The residues typically comprises heavier oil components that are difficult to process further into desirable higher value products and therefore constitute a process loss that reduces the overall process efficiency. Such residues in prior art processes may be generated as a result of blending petroleum derived compositions with the renewable crude oil and separating the noncompatible part (i.e. the residues) whereby the first blend component typically comprises a lighter fraction of the original first blend component or as a result of fractionation of the renewable crude oil into a lighter distillate fraction and a heavier residue fraction.

For the hydrocarbon blends according to present invention the amount of residues is minimized or eliminated i.e. the overall process efficiency is improved. As a consequence the hydrocarbon blends according to the present invention will typically have higher amount of higher boiling components that can be processed into higher value products having a low carbon foot print compared to conventional petroleum derived products due to the high amount of renewables.

A particularly attractive drop in point for the intermediate blend component according to the invention or blending point resulting in a hydrocarbon blend according to the present invention is blending with gas oil and/or vacuum gas oil prior to hydroprocessing as will further be illustrated by the solubility profiles exemplified in the following. As the compatibility of the hydrocarbon blends according to the present invention is improved, further advantages, such as enhanced processability e.g. less tendency to reactor clogging, less catalyst deactivation, generally smoother and robust refinery operation and higher ratios of the first fuel blend component, may be obtained by the hydrocarbon blends according to the present invention. All of these are important decision factors for a refinery to introduce unconventional first blend components containing renewable components into refineries.

Example 5: Hansen Solubility Parameters

Hansen Solubilty Parameters (HSP) is a methodology for describing the solubility, blendability and stability of various solvents and substances and is widely used in e.g. the polymer and paint industries. A good description of the methodology is given in C. M. Hansen, "Hansen Solubility Parameters—A Users Handbook", Second Edition, CRC Press, Taylor & Francis Group, LLC. (2007), hereby incorporated herein as reference.

The methodology takes three types of molecular interactions into consideration: $\Delta E_d$ for dispersion (related to van der Waals forces); $\Delta E_p$ for polarity (related to dipole Moment) and, $\Delta E_h$ for hydrogen bonding, (Eq.1). The total solubility parameter ($\delta_T$), is obtained by dividing equation 1 by the molar volume yields (Eq.2).

$$\Delta E = \Delta E_d + \Delta E_p + \Delta E_h \tag{Eq.1}$$

$$\delta_T^2 = \delta_d^2 + \delta_p^2 + \delta_h^2 \tag{Eq.2}$$

As described by Hansen, these three parameters can be illustrated in a 3D diagram as a fixed point for pure solvents and as a solubility sphere for complex mixtures samples. The center of a solubility sphere corresponds to its Hansen Solubility parameters and its radius ($R_o$), or so-called interaction radius, determines the boundary of suitable solvents, which are normally contained within the sphere, with the insoluble solvents located on the outside of the sphere. Hansen Solubility Parameters is based on "like dissolves like" principle in which the Hansen Solubility Parameter distance metric measures likeness, which means solvents with similar values of $\delta_D$, $\delta_P$, and $\delta_H$ parameters are likely to be compatible.

When a solubility profile is determined on complex mixtures, there are two parameters that should be included in the study, the distance between materials (Ra) in the sphere plots and the relative distance of one solvent or mixture of two or more solvents from the centre of the sphere (RED number). Ra can be determined by volume or weight additivity of the respective parameters (Eq. 3), and the RED number corresponds to the ratio between Ra and the sphere radius ($R_o$) (Eq.4)

$$Ra^2 = 4(\delta_{d1} - \delta_{d2})^2 + (\delta_{p1} - \delta_{p2})^2 + (\delta_{h1} - \delta_{h2})^2 \tag{Eq.3}$$

$$\text{RED} = \frac{Ra}{R_o} \tag{Eq.4}$$

The relative distance RED is equal to 0 when the solvent and the sample under investigation have the same Hansen Solubility Parameters; compatible solvents or mixture thereof will have RED values less than 1 and, the RED value will increase gradually with the reduction of solubility in between solvent and solute.

Determination of Hansen Solubility Parameters

The Hansen Solubility Parameters for renewable crude oils Oil A, Oil B, Oil C produced in example 1 and upgraded renewable oils from example 2 and 3 as well as different fossil crude oils and boiling point fractions were determined using the solvents and procedures described below.

Materials

For comparison purpose, solubility profiles of a fossil crude oil was determined. For the solubility tests, the following solvents acquired from commercial chemical suppliers were used: 1-propanol (99.5%), 1-butanol (99.8%), 2-butanone (99.0%), 2-heptanone (98%), acetaldehyde (99%), acetyl chloride (99.9%), acetone (99.9%), acetonitrile (99.9%), acetylacetone (99%), 1-Butanethuil (99%) cyclohexane (99.5%), cyclopentanone (99%), diethyl ether (99.0%), ethyl acetate (99.8%), furfural (98%), hexanal (97%), hexane (97.0%), isopropyl acetate (98%), lactic acid solution (85%), m-cresol (99%), methanol (99.9%), pentane (99%), phenol liquid (89.0%), tetrahydrofural (99.9%), toluene (99.8%) Sigma-Aldrich. Tetrahydrofurfuryl alcohol (99%), 1-methylimidazole (99%), 2,6 dimethylphenol (99%), dimethyl disulfide (≥99.0%), glycidyl methacrylate (≥97.0%), trirolyl phosphate (90%) Aldrich. 2-methoxyphenol (≥98%), anisole (99%), dichloromethane (≥99.5%), propylene oxide (≥99%) Alfa Aesar. Glycerol and ethylene glycol (general use) BDH. Hydrogen peroxide (USP-10 volume) Atoma.

Procedure for the estimation of the Hansen Solubility Parameters

The Hansen Solubility Parameters of the oils studied were determined by a set of solubility tests and HSP model described in in C. M. Hansen, "Hansen Solubility Parameters—A Users Handbook", Second Edition, CRC Press, Taylor & Francis Group, LLC. (2007), and HSPiP software writen by Abbott S. & Yamamoto H. (2008-15).

Initially, 20 organic solvents were mixed with the oils in question at ambient temperature and classified as "good" (i.e. soluble), "partially soluble" or "bad" (i.e. insoluble) solvents based on the observed and measured degree of solubility.

Figure 8:
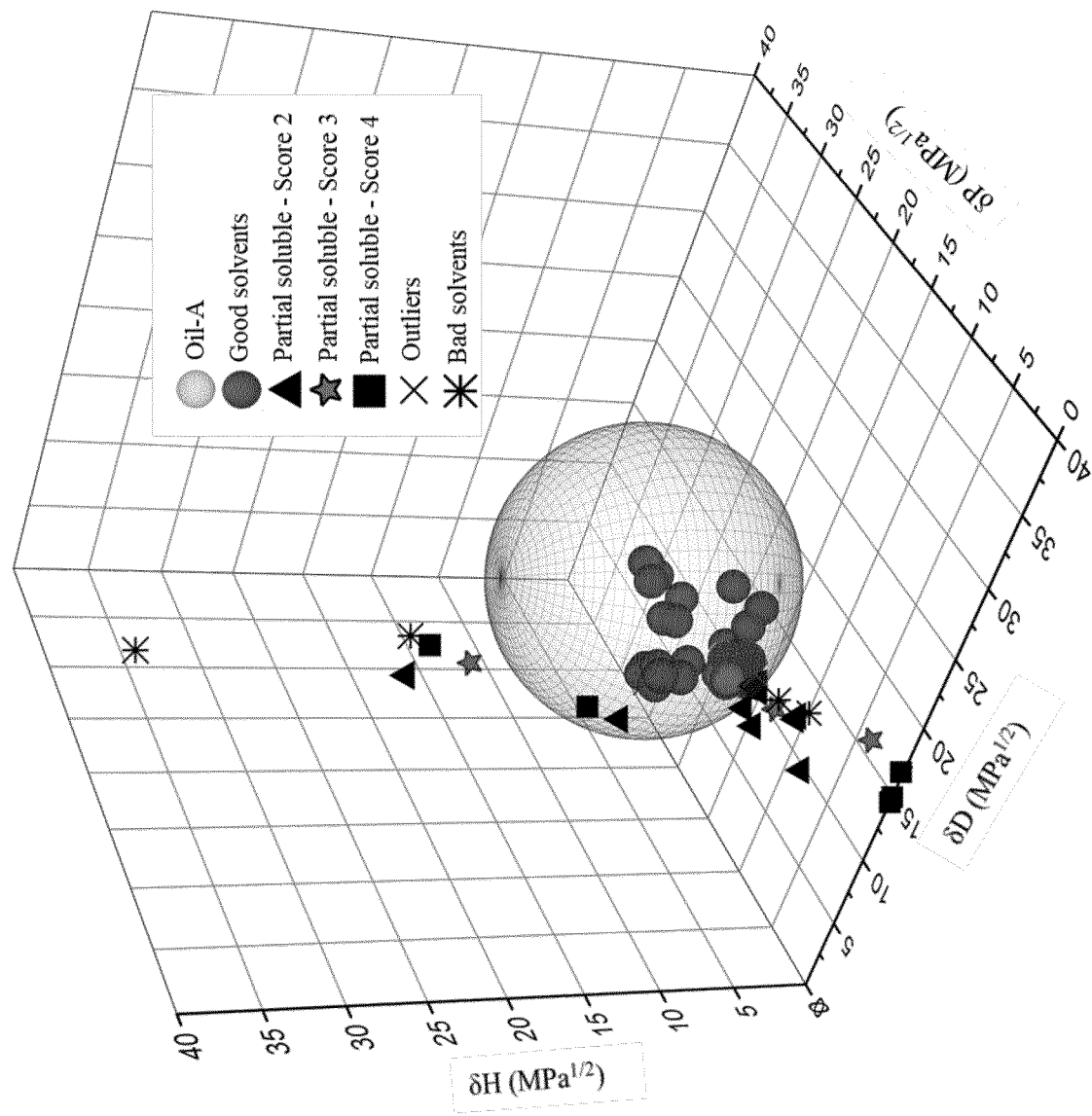
FIG. 8 shows a 3D plot of the Hansen Solubility Parameters for a renewable crude oil (Oil A) produced in example 1.

As the solubility parameters of the oils studied were unknown, the set of solvents used for the first screening had a wide range of Hansen Solubility Parameters. After the initial solubility tests were completed and a first approximation of HSP achieved, solvents with Parameters closer to those of the oil studied were selected in order to increase the precision of the Hansen Solubility Parameter model. A pseudo-3-D representation (sphere) of the Hansen Solubility Parameters was built from the initial results using the HSPiP software is shown in FIG. 8.

In this representation, the "good" solvents are placed inside or on the surface of the sphere, while partially soluble or insoluble solvents are placed outside the sphere. Once the initial Hansen Solubility Parameters are determined for the oil studied, the software estimates the relative distance (RED) by equation 5. RED is the ratio of the modified difference between the solubility parameters of two substances, Ra (i.e. samples under study and a solvent), and the maximum solubility parameter difference, which still allows the sample to be dissolved in the solvent, $R_M$.

$$\text{RED} = \frac{Ra^2}{R_M^2} = \frac{\left[(\delta_{D_2} - \delta_{D_1})^2 + \frac{(\delta_{P_2} - \delta_{P_1})^2}{4} + \frac{(\delta_{H_2} - \delta_{H_1})^2}{4}\right]}{R_M^2} \quad \text{Eq. (5)}$$

Thus, the relative distance RED is equal to zero (RED=0) when the solvent and the sample under investigation have the same Hansen Solubility Parameters. Red is equal to 1 (RED=1) when the HSPs of the solvent are placed on the surface of the sphere, and RED is greater than 1 (RED>1) when the sample is insoluble in the solvent, or the solvent is a poor solvent. Once the approximate Hansen Solubility Parameters and RED values are estimated for the oil in question, the precision of the model can be increased.

This is achieved by performing solubility tests with a new set of solvents or mixtures of solvents selected based on their RED values as predicted by the HSPiP software. Hansen Solubility Parameters of both tested solvents and mixtures should be placed on the surface and near to the center of the 3D sphere model. After the model is refined, the software HSPiP can be used as a prediction tool of suitable solvents depending on the function required; i.e. bridge of solubility, emulsion breaker, precipitation of insoluble material on a determined chemical. A list of solvents and solvent mixtures used is presented in FIG. 9*a*/9*b*.

The solubility tests were performed in a set of conical glass tubes with cap, by placing approximately 0.5 g of one sample and 5 ml of a solvent or mixture. The solubility tests were performed in triplicate. The tubes were kept under sonication for 5 hours and allowed to rest overnight at room temperature.

Figure 6:
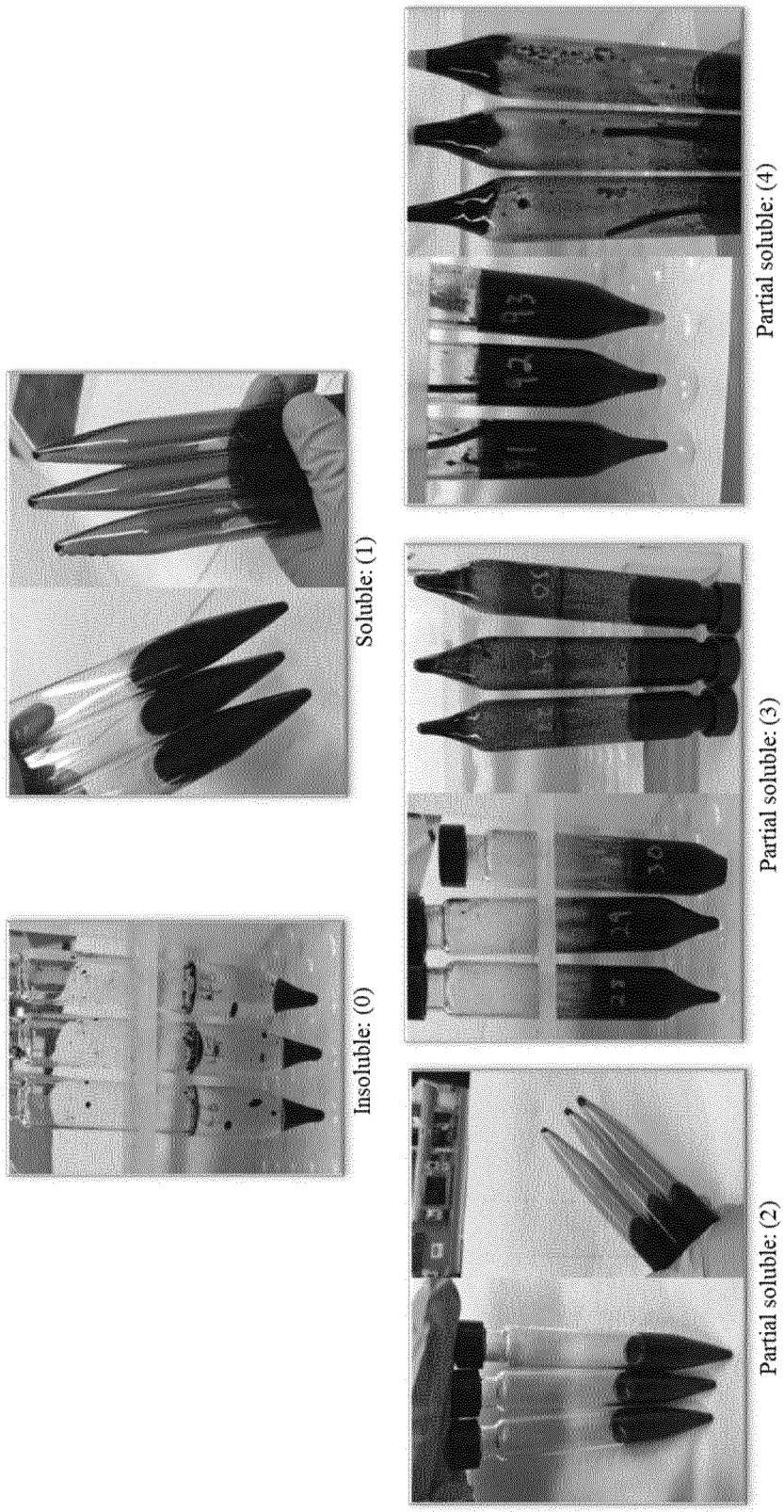
FIG. 6 shows photos of the solvent ranking applied in solubility test.

Subsequently, the contents of each tube were visually inspected and classified in 5 categories as: soluble (1): when there is no observable phase separation or solid precipitation in the glass tubes; partially soluble (2-4) when big solids or a lump of oil appears, indicating that the sample is not completely dissolved in the solvent or the mixture; and, not soluble (0) are those mixtures that have well-defined phases. The degree of partial solubility ranges from 2 to 4, with 2 indicating the highest relative solubility FIG. 6 illustrates examples of each of the solubility categories.

Due to the dark color of the samples, it is difficult to visually distinguish between the categories soluble (1) and partially soluble (2) so these samples were marked "uncertain". To assess the solubility of these "uncertain" samples, the "spot test" method was used as a more precise blend stability/compatibility indicator. This method is widely used to assess the compatibility of marine fuel blends and has been used e.g by Redelius [P. Redelius, "Bitumen solubility model using hansen solubility parameter," *Energy and Fuels*, vol. 18, no. 4, pp. 1087-1092, 2004] for Hansen Solubility Parameter analysis. The spot test was performed by placing a drop of each "uncertain" solution on a filter paper, and evaluated based on the criteria of the spot test method given in P. Products, and R. S. Sheet, "Cleanliness and Compatibility of Residual Fuels by Spot Test," vol. 4, no. Reapproved 2014, pp. 2014-2016, 2016: If a uniform color spot is formed as shown in FIG. 7 a the mixture is considered fully soluble (i.e. category 1), whereas if two separate concentric spots are formed as shown in FIG. 7*b*, the solvent is considered partially soluble (i.e. category 2).

Example 6: Hansen Solubility Parameters for Renewable Crude Oils

The Hansen Solubility Parameters and solubility profiles of the renewable crude oils produced by hydrothermal liquefaction in example 1 (Oil A, B and C) were determined using a total of 36 solvents and 23 solvent mixtures. The results are summarized in FIG. 8a/8b. The 3D representation of the HSPs for Oil A (FIG. 8) has a good fit of 0.965 with 24 solvents placed inside the sphere and 33 solvents outside the sphere. The score and RED values for each solvent are shown in FIG. 8a/8b. The solvents with a RED value equal to 1 are located on the surface of the sphere, those with values less than 1 are located inside of the sphere and those with values greater than 1 are located outside of the sphere. Thus, the closer the RED value is to 0, the closer the solvent or mixture is to the center of the sphere. To estimate the correlation between Hansen Solubility Parameters for the renewable crude Crude Oils, the parameters for Oil B and Oil C were also determined. In this case 11 solvents were enough for the HSP determination as shown in FIG. 9a/9b.

Figure 11:
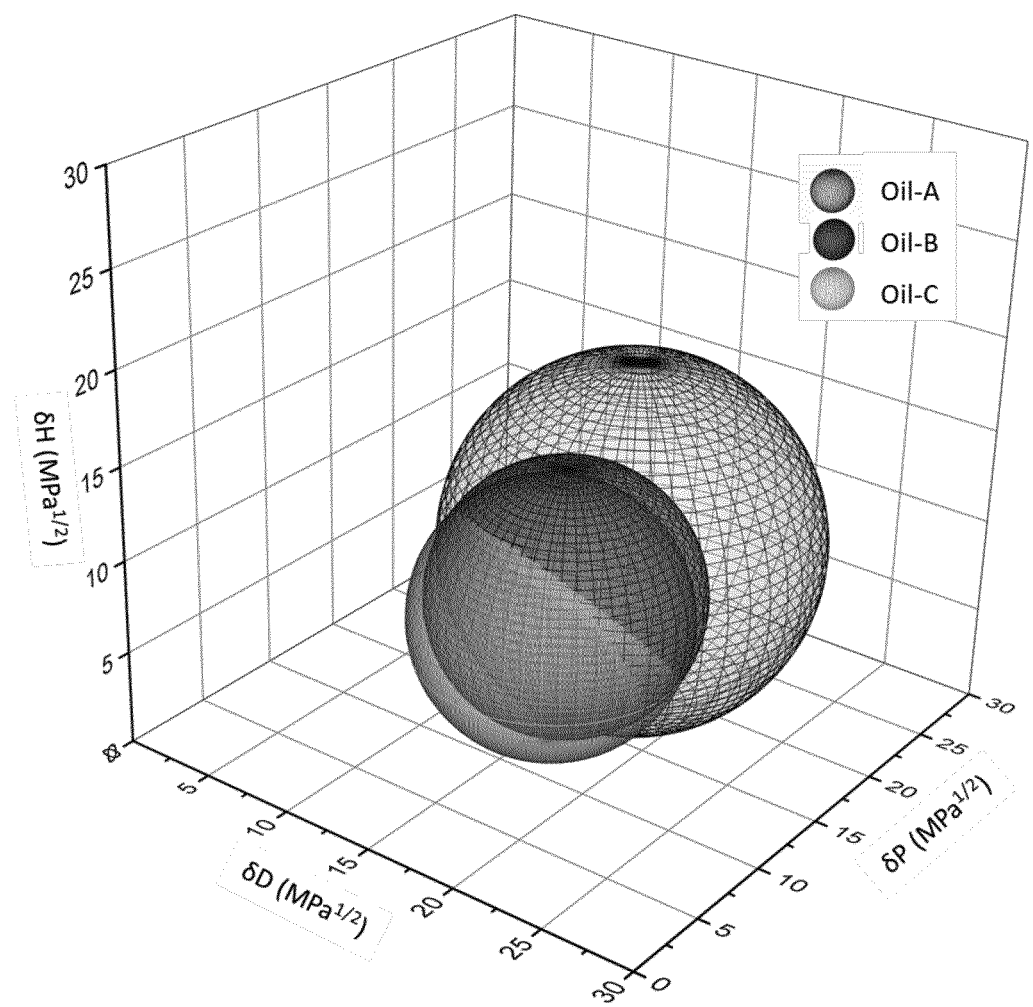
FIG. 11. shows a 3D plot of the Hansen Solubility Parameters for the renewable crude oils: Oil A, Oil B and Oil C produced in example 1.

The three renewable crude oils, Oil A ($\delta_D$: 19.19, $\delta_P$: 14.52, $\delta_H$: 11.61, $R_0$:9.3), Oil B ($\delta_D$: 18.36, $\delta_P$: 10.43, $\delta_H$: 10.06, $R_0$: 6.7), and Oil C ($\delta_D$: 18.13, $\delta_P$: 9.59, $\delta_H$: 9.25, $R_0$: 6.8) have similar solubility profiles and can be visualized in FIG. 11. However, Oil A has higher polarity and stronger hydrogen bonding interactions than oils B and C. Comparing the parameters for the three biocrudes, it can be seen that they are similar with the only exception being that Oil C was partially soluble in 1-Methyl imidazole while oils A and B were soluble as seen in FIG. 9a. The difference in the Hansen Solubility Parameters for the renewable crude oils under study can be associated with the biomass feedstock used to produced each oil, i.e. Birch in Oil A; Pine EW in Oil B and Oil C, and processing conditions as described in example 1.

Example 7: Hansen Solubility Parameters for Partially Upgraded and Upgraded Oil The Hansen Solubility Parameters Score and RED values obtained for partially upgraded renewable oils in the example 2 are summarized in FIG. 8a/8b and FIG. 9.

As shown in FIG. 9a/9b a total of 18 solvents were used to determine the Hansen Solubility Parameters of the partially upgraded renewable oil II from example 2 ($\delta_D$: 17.95, $\delta_P$: 10.96, $\delta_H$: 9.96). A 3D representation of the Hansen Solubility sphere for the partially upgraded from example 2 is shown in FIG. 11. The Hansen Solubility Sphere has a fit of 0.883, excluding 1 outlier solvent. 15 solvents were used to determine the Hansen solubility profile of the upgraded renewable oil following the methodology described in example 3. The Hansen Solubility Sphere of the upgraded oil is visualized in FIG. 11 and has a fit of 1.000 and the Hansen Solubility Parameters: $\delta_D$: 17.36, $\delta_P$: 8.01, $\delta_H$: 7.59.

Figure 12:
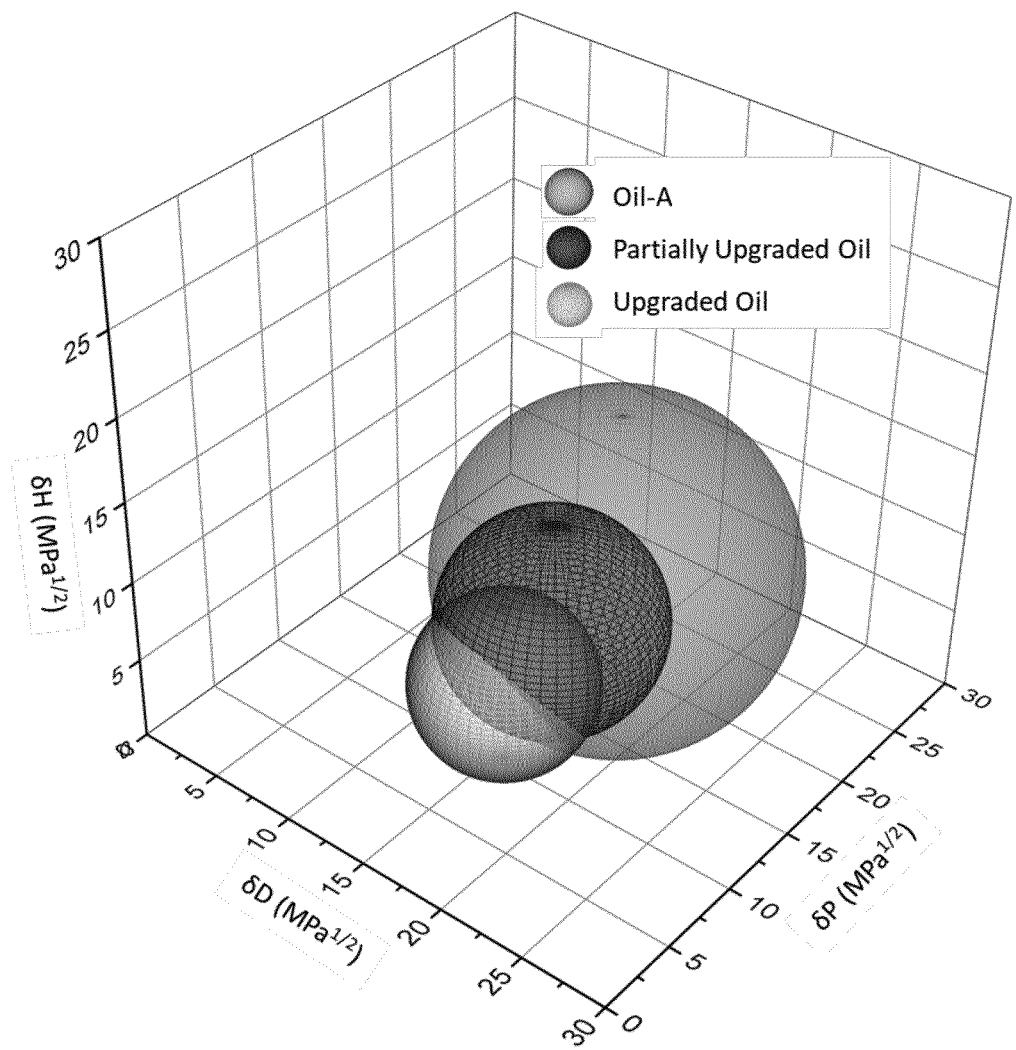
FIG. 12. shows a 3D plot of the Hansen Solubility Parameters for renewable crude oil-Oil A (example 1), partially upgraded renewable oil (example 2), and upgraded renewable oil (example 3)

As seen from FIG. 12, the Hansen Solubility Parameters and radius of solubility were different for biocrude, partial upgraded and upgraded oil which indicates the effect of upgrading process on solubility properties. The renewable crude oil (Oil A) has a strong polarity, high disperse interaction and a strong hydrogen bonding interaction. After one step of upgrading (partial upgrading) including hydrogenation, full deoxygenation and mild cracking of the renewable crude oil, the so-called partial upgraded oil exhibited considerable reduction in polarity, hydrogen bonding interaction and radius of solubility. This can be attributed to the fact that the presence of oxygen, heteroatoms and metals highly contributed to the polarity parameter. In fact the more upgraded the crude oil, the lower the values of the three Hansen Solubility Parameters and this can be clearly visualized when comparing the solubility profile of the renewable crude oil and partially upgraded oil with a fully upgraded oil. The latter exhibited lower dispersion, polarity and hydrogen bonding interaction as well as lower radius of solubility.

The RED value of the partially upgraded oil in the solubility sphere of the biocrude oil, is rather low (0.524) suggesting full solubility. However, the RED value of the upgraded oil (RED=0.934) is close to the solubility limit of RED≥1 showing poor solubility in the biocrude. Therefore the solubility between biocrude and upgraded oil is inversely proportional to the degree of upgrading thereof.

Example 8: Compatibility of Upgraded Renewable Oil with Petroleum Crude Oils Compatability of the renewable oil with petroleum oils are important for many practical applications of the renewable oil e.g. for co-processing in petroleum refeneries and for transport in pipelines.

Figure 13A:
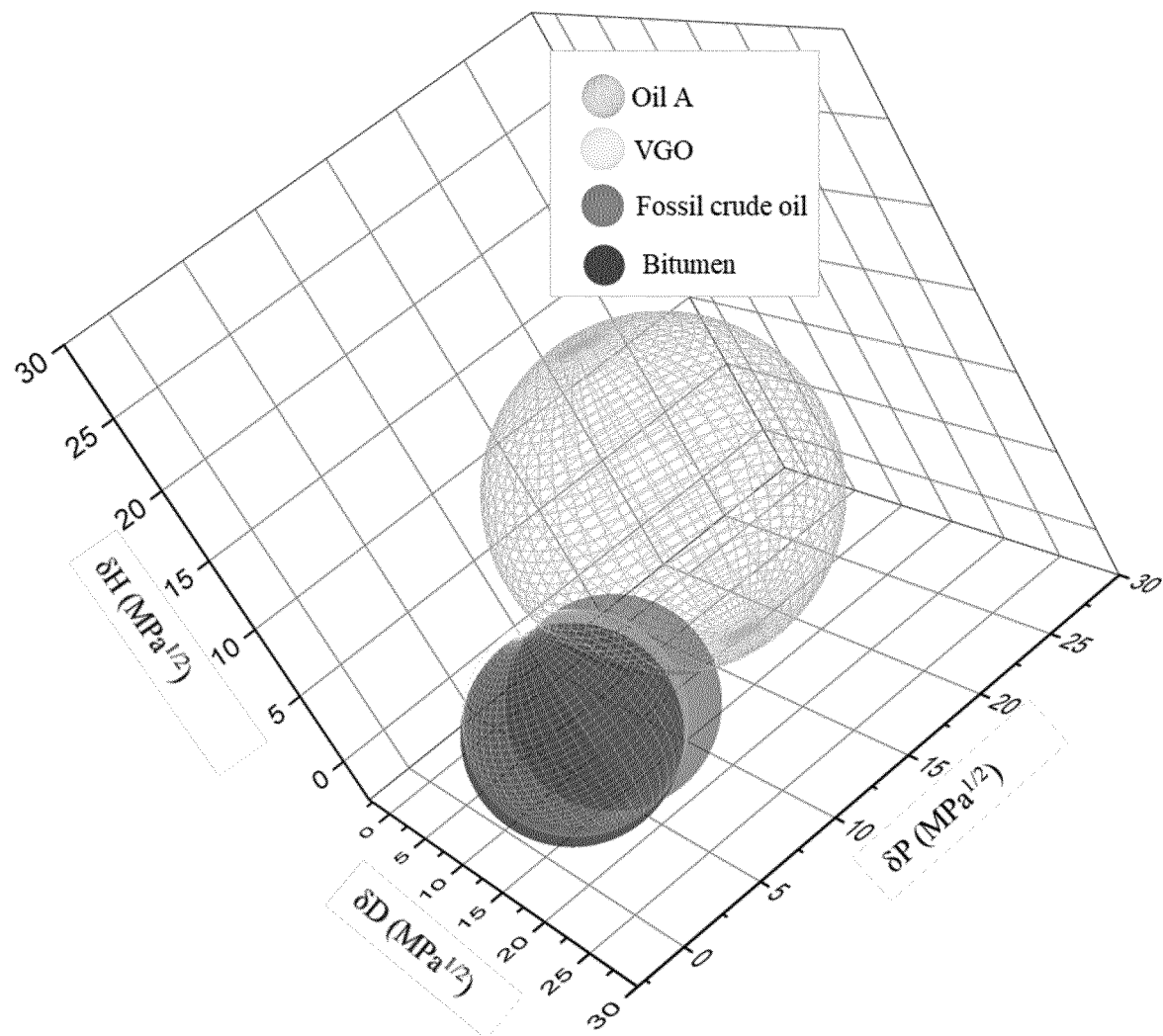
FIG. 13a, FIG. 13b and FIG. 13c. shows a 3D plot of the Hansen Solubility Parameters of fossil crude oil, VGO and bitumen compared to renewable crude oil, partially upgraded oil and upgraded oil respectively.
Figure 13B:
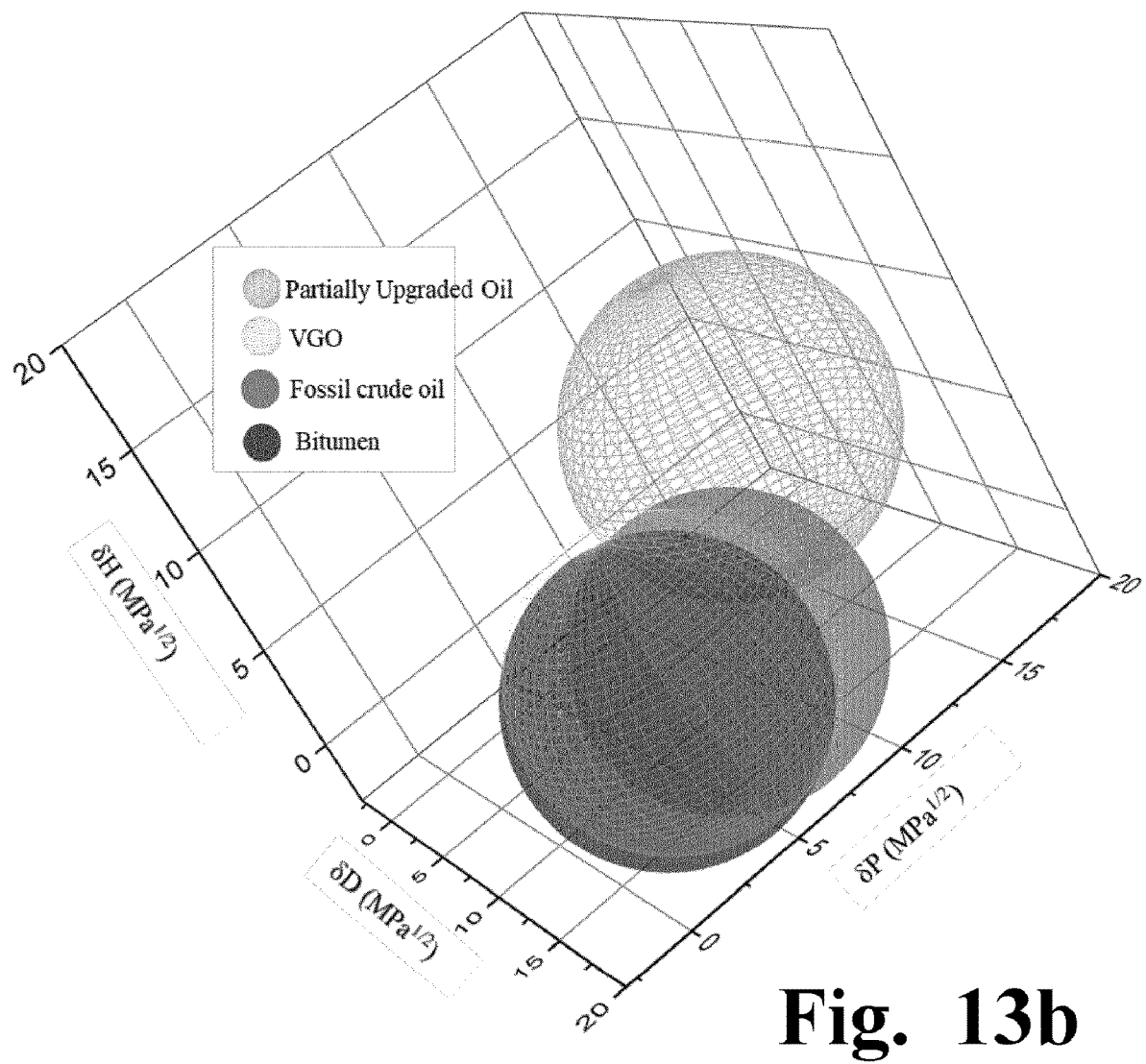
Figure 13C:
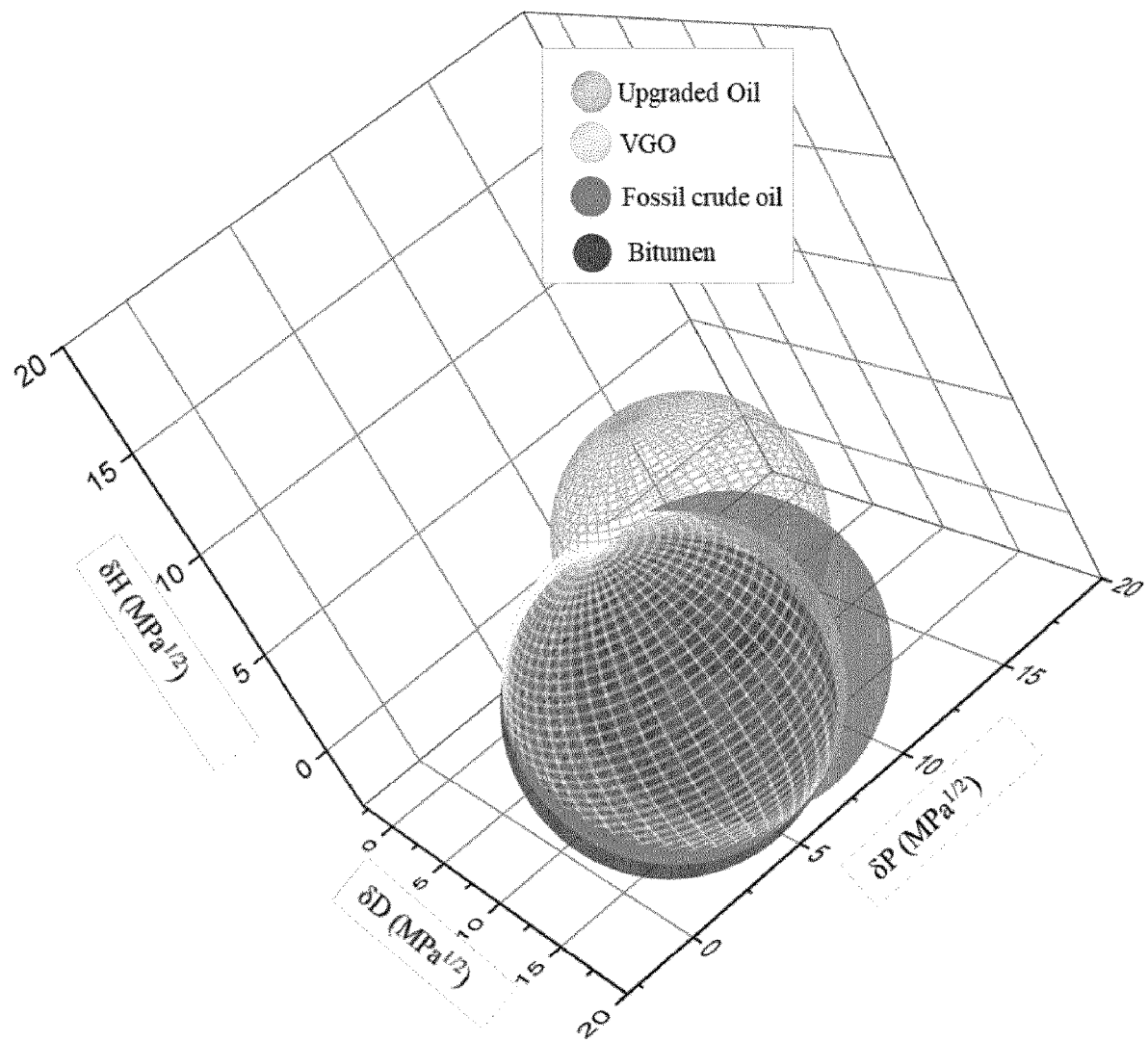

A Hansen Solubility Parameter analysis was used to test compatibility of upgraded renewable oil with Vacuum Gas Oil—VGO, bitumen and petroleum crude such purposes. The results are shown in FIG. 14 and visualized in FIGS. 13a, 13b and 13c. As seen from the figures, the petroleum crude oil, VGO and bitumen has differences in polarity and hydrogen bonding parameters compared to the upgraded renewable oil. However, the solubility profiles also show that there are areas of overlapping in between their Hansen Solubility Parameter spheres. Furthermore, the center of the sphere of the petroleum crude oil is placed in the boundary limit of solubility of upgraded oil i.e. RED=0.981, which not only increases the solubility ratio between the upgraded biocrude and the petroleum crude oil, but also indicates that after a deep hydrotreatment, the upgraded biocrude solubility profile becomes very close to the solubility profile of the petroleum crude oil, which means that after upgrading the renewable crude oil via hydroprocessing, the upgraded oil present similar properties compare to the fossil crude oil.

Example 9: Co-Processing Biocrude and/or Partially Upgraded Renewable Oil with Petroleum Crude Oils To assess co-processing of renewable crude oil and/or partially upgraded renewable oil with petroleum crude oil and heavy petroleum crude oil fractions such as Vacuum Gas Oil (VGO) the solubility profiles of a petroleum crude oils were determined. A total of 21 solvents were used to determine the Hansen Solubility Parameters of the fossil crude oil ($\delta_D$: 18.47, $\delta_P$: 6.67, $\delta_H$: 3.58) and VGO ($\delta_D$: 19.1-19.4, $\delta_P$: 3.4-4.2, $\delta_H$: 4.2-4.4). Its 3D representation has a great fit of 1.000 with a radius of solubility of 5.6 and 5.8, respectively FIGS. 13 a, b and c show the spheres of solubility profiles obtained for renewable crude oil, partial upgraded, fossil crude oil, VGO and Bitumen ($\delta_D$: 18.4, $\delta_P$: 4.0, $\delta_H$: 0.6; $R_0$: 5.76). Bitumen Hansen solubility parameter were determined by Redelius, "Bitumen Solubility Model using Hansen Solubility Parameters, Energy and Fuels, vol. 18, no. 4, pp. 1087-1092, 2005.

Even though the disperse interaction parameters of the biocrude, fossil crude oil, VGO and bitumen are similar, there is a considerable difference in the polarity and hydrogen bonding interaction parameters. The RED values of fossil oil, VGO and Bitumen in the solubility sphere of biocrude are 1.248, 1.415 and 1.506, respectively. These RED values are above the limit of solubility RED≥1 showing only partial solubility in the biocrude (FIG. 12a). This was confirmed by blending laboratory tests in proportions from 5 to 50 wt. % of biocrude in petroleum crude oil. The same behavior was observed when comparing the Hansen Solubility Parameters of partially upgraded oil with petroleum crude oil, VGO and bitumen, where the difference in the polarity and hydrogen bonding interaction parameters is high. The RED values of fossil oil, VGO and Bitumen in the solubility sphere of partially upgraded oil are above the limit of solubility RED≥1 (1.282, 1.534 and 1.611, respectively), showing partial solubility in the partially upgraded oil at room temperature. The solubility of mixtures of partial upgraded biocrude and petroleum crude oil, bitumen or vacuum residue is improved by increasing the temperature. The experimental tests show that mixtures of partial upgraded biocrude and petroleum oil or heavy derivated fraction in the ratio of 9:1 become soluble and compatible by spot test analysis when the mixtures are heated to a temperature in the range 70-130° C. Hence, the first blend component comprising a renewable hydrocarbon and the linker substance, and the second component is in an advantageous embodiment of the present invention both heated to a temperature of 70-150° C. such as 80 to 120° C. prior to manipulating them to form a homogeneous mixture. For a selection of linker substances that fulfill all the above solubility and usability criteria, various linker substances such as solvent combinations were screened on the HSPiP software to identify suitable mixtures that do not exceed the solubility limit i.e. RED≤1. Through the testing of a number of solvents and mixtures; it was blending tests confirmed that the addition of 2 wt. % of Toluene or the blend MEK/m-cresol (70:30) increase the solubility of biocrude and Bitumen. Although the mixture were not fully compatible at room temperature, it becomes compatible by spot test analysis when the blend is heated to 150° C.

Figure 15A:
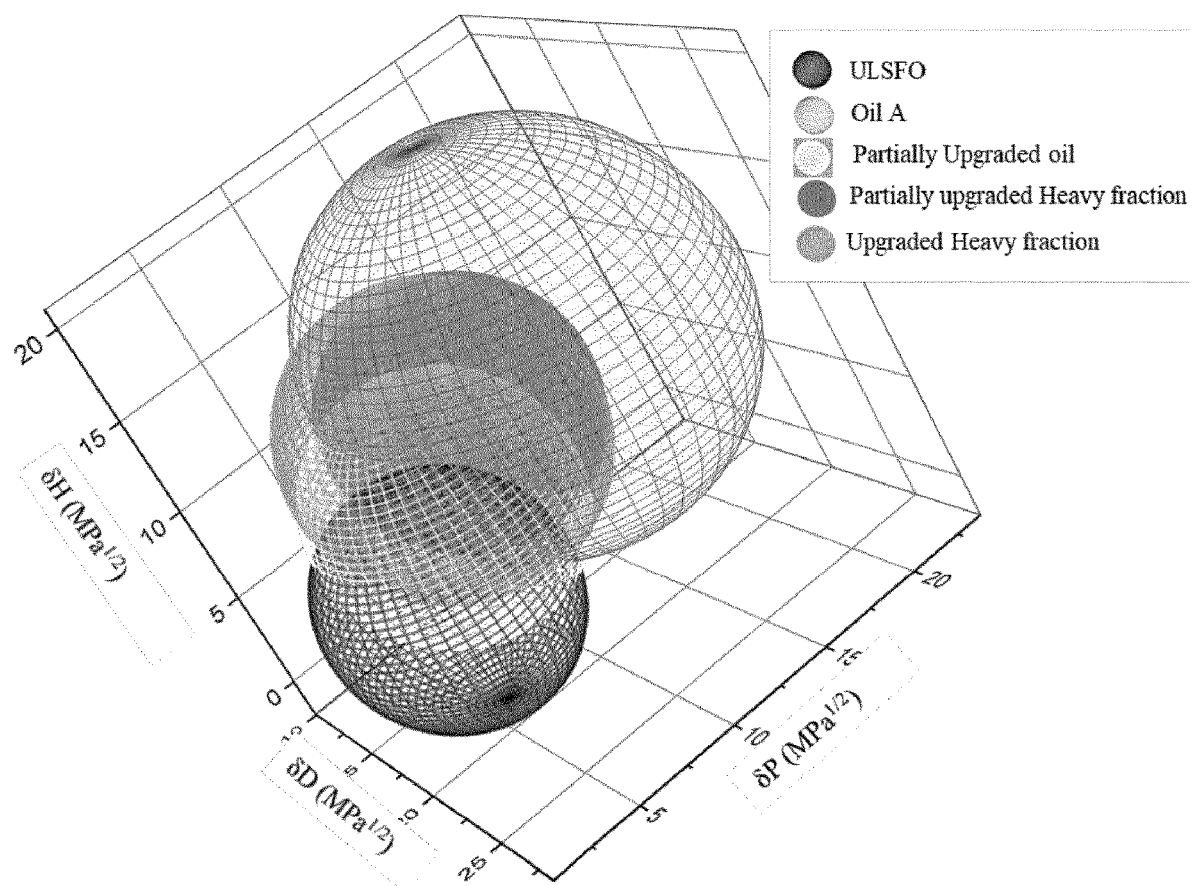
FIGS. 15a and 15b shows a 3D plot of the Hansen Solubility Parameters of Ultra Low Sulphur and High Sulphur Fuel Oils compared to Partially Upgraded Oil, Partially Upgraded Heavy Fraction and Upgraded Heavy Fraction.
Figure 15B:
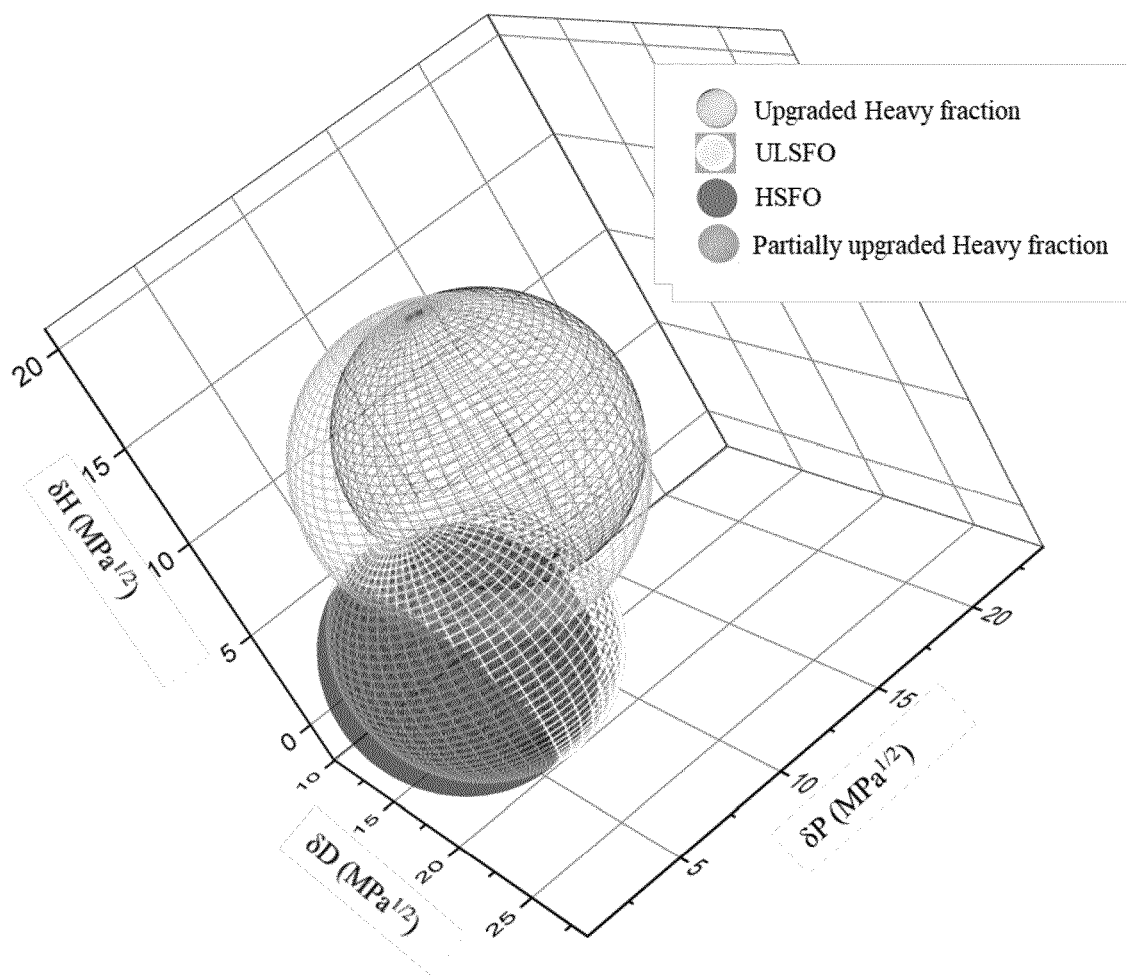

Example 10: Hansen Solubility Parameters of Fractions of Renewable Crude Oil and Upgraded Renewable Oil Compatibility of fractions of raw biocrude, partially upgraded oil and upgraded oil with its fossil counterparts is important to evaluate those blends in process such as recirculation in renewable oil hydroprocessing and co-processing with petroleum fractions and/or other bio-oils. Therefore, the Hansen Solubility Parameters of the fractions listed below were determined by methodology described in example 4. The upgraded fractions were obtained by distillation of the partially upgraded and upgraded oils were produced as described in examples 2 and 3. FIGS. 15a and 15b shown the 3D representation of the Hansen solubility profile of the upgraded heavy fractions.

TABLE 8

Hansen Solubility Parameters fractions of raw biocrude, partially upgraded oil and upgraded oil

| Sample | $\delta_D$ [MPA$_{1/2}$] | $\delta_P$ [MPA$_{1/2}$] | $\delta_H$ [MPA$_{1/2}$] | $R_o$ |
|---|---|---|---|---|
| Renewable crude oil fraction IBP-530° C. | 18-19.5 | 8-13 | 7-10 | 5-9 |
| Heavy fraction - PUO | 17-19 | 7.5-12 | 7-10 | 5-9 |

TABLE 8-continued

Hansen Solubility Parameters fractions of raw biocrude, partially upgraded oil and upgraded oil

| Sample | $\delta_D$ [MPA$_{1/2}$] | $\delta_P$ [MPA$_{1/2}$] | $\delta_H$ [MPA$_{1/2}$] | $R_o$ |
|---|---|---|---|---|
| Heavy Fraction - UO | 17-19 | 7-9.5 | 7-10.5 | 4-8 |

PUO: Partially Upgraded Oil
UO: Upgraded Oil

As seen from FIGS. 15a and 15b, the Hansen Solubility Parameters and radius of solubility becames similar to fossil fuels i.e. Ultra Low Sulphur Fuel Oil—ULSFO and High Sulphur Fuel Oil—HSFO.

Example 11: Compatible Diluents, Viscosity Reducing Agents and Storage Stability Enhancers for Renewable Crude Oils Fully compatible synthetic diluents or viscosity and/or density reducing agents for the renewable crude oil are desirable for many practical applications including diluents to improve fluidity of the renewable crude oil, enhance separation efficiency during the production process e.g. by solvent/diluent assisted separation of the renewable crude oil or to improve the storage stability of the crude oils.

Using the solubility profile of the biocrude, a list of solvents were selected that fit within the sphere of "Oil A" Hansen Solubility Parameters solubility profile. These solvents were selected as suitable to compose the desired "synthetic lights" mixture.

This list of solvents was further narrowed using the following criteria: a) low-toxicity, b) ease of separation from the renewable crude oil e.g. by boiling point, c) non-complex geometry, d) solvents that do not contribute increasing the oxygen content of the biocrude, e) solvents that do not contain other heteroatoms (i.e. Nitrogen, sulfur, chloride, etc.) or metals that can contribute to the deterioration of the quality of the biocrude f) local availability of solvents and g) cost.

A light fraction with a cut off boiling point of 130° C. was from renewable crude oil A produced in example 1 produced in a rotary evaporator. The families of compounds that represent the major volume percentages of the renewable crude light fraction were established based on the gas chromatography analysis of the renewable crude oil light, i.e. Substituted benzenes: 15 vol. %, $C_4$-$C_6$ ketones: 50 vol. %, alkanes: 24 vol. % and alcohols: 11 vol. %.

Based on this approach, a mixture containing methyl ethyl ketone, alkanes (e.g. octane, nonane), p-xylene and/or toluene, and 1-butanol and/or propanol was identified as suitable to emulate the light ends of the renewable crude oil as "synthetic lights".

TABLE 9

Hydrofaction ™ crude oil lights end identification and mixtures examples

| Family | Composition Proposed [vol. %] | solvents | Mixture composition [vol. %] | | |
|---|---|---|---|---|---|
| | | | 1 | 2 | 3 |
| Substituted benzene | 15 | p-xylene$_a$ | 15 | 10 | 10 |

TABLE 9-continued

Hydrofaction™ crude oil lights end
identification and mixtures examples

| Family | Composition [vol. %] | Proposed solvents | Mixture composition [vol. %] | | |
|---|---|---|---|---|---|
| | | | 1 | 2 | 3 |
| $C_4$-$C_6$ ketones | 50 | MEK | 50 | 40 | 25 |
| Alkanes | 24 | Octane | 24 | 30 | 35 |
| Alcohols | 11 | 1-butanol | 11 | 20 | 30 |
| RED -Biocrude | 1.43 | — | 1.43 | 1.45 | 1.47 |

$_a$p-xylene may be substituted by toluene, or by a solvent mixture of toluene/xylene 50%/50%

TABLE 10

HSParameters of pure solvents and mixture examples

| Solvent | $\delta_D$ [MPa$_{1/2}$] | $\delta_P$ [MPa$_{1/2}$] | $\delta_H$ [MPa$_{1/2}$] |
|---|---|---|---|
| p-xylene | 17.8 | 1 | 3.1 |
| MEK | 16 | 9 | 5.1 |
| Octane | 15.5 | 0 | 0 |
| 1-butanol | 16 | 5.7 | 15.8 |
| Mixture composition 1 | 16.3 | 5.3 | 4.8 |
| Mixture composition 2 | 16.0 | 4.8 | 5.5 |
| Mixture composition 3 | 16.0 | 4.1 | 6.3 |

The volume percentages of each solvent in the selected mixture are shown in table 9. The initial value of RED score (1.53) of Hansen Solubility Parameters of a similar mixture (table 9) was obtained using the volume concentration of the lights obtained by GC-MS.

Table 9 further show some volume concentrations of the solvent mixture that have similar RED values, which means that all the mixtures proposed are close enough to the behaviour of the real light mixture from the renewable crude oil and the Hansen Solubility Parameters for the individual solvent and the combined linker substance I shown in table 10.

Example 12: Co-Processing Biocrude and/or Partially Upgraded Renewable Crude Oil with Fossil Crude Oils Using Linker Substances For a selection of solvents that fulfill all the above solubility and usability criteria, various linker substances such as solvent combinations were screened on the HSPiP software to identify suitable mixtures that do not exceed the solubility limit i.e. RED≤1.

Through the testing of a number of solvents and mixtures; it was confirmed that 1) the addition of 2 wt. % of Toluene or 2 wt % of the blend MEK/m-cresol (70:30) increase the solubility of biocrude and Bitumen. Although the mixture were not fully compatible at room temperature, it becomes compatible by spot test analysis when the blend is heated to 150° C. 2) Biocrude and Vacuum Gas Oil (VGO) blend become compatible by the addition 2 wt. % of solvent mixtures with HSP of about $\delta_D$: 15.6, $\delta_P$: 8.3, $\delta_H$: 9.4. e.g Acetone (60 wt. %)+ Propanol (30 wt. %)+ pentane (10 wt. %). 3) Partially upgraded oil and VGO blends are compatible in a proportion up to 25% of Partially upgraded oil without the use of linkers.

Example 13: Linker Substances for Blending of Renewable Oil with Marine Fuels to Produce Low Sulphur Marine Blends Blending tests were performed in order to test the solubility of low sulphur marine fuel blendstocks with renewable liquids (crude oil, partially upgraded renewable oils and the 350+° C. boiling fractions from the same oils) using concentrations in the range of 2 to 50 wt. % of renewable liquids. The tests showed only partial solubility of the renewable liquids with low sulfur marine fuel blendstock (RMG 180 Ultra Low sulphur fuel oil according to the ISO8217 (2012) standard), at any of the blending ratios tested. Obviously, such blend stock has compatibility issues that lead to precipitation, separation, and/or sedimentation of the insoluble components, etc. if used directly in blends with other marine fuels. Hence, a renewable blendstock not suffering from such compatibility issues are highly desirable.

A Hansen Solubility profile analysis was performed in order to identify a linker substance that will enable the blending of liquids in marine fuels. As visualized in FIGS. 15a and 15b, there is overlapping of the sphere of solubility for each oil, which means that although their Hansen Solubility Parameters are different and the RED distance between their centre of solubility is greater than 1, they are partially soluble.

The identified potential mixtures of solvents that may acts as linker substances are mainly composed of sulfur-containing solvents, ketones, alkanes, and alcohols as well as aromatic compounds like toluene, xylene, and creosol.

Example 14: Low Sulphur Fuel Blend Comprising a First Fuel Blend Component Containing a Renewable Component Based on the solubility profiles described in example 13 first fuel blend components containing a renewable component were produced from the heavy fraction of upgraded renewable crude oil having a boiling point of 350+° C. and the Hansen Solubility Parameters ($\delta_D$: 17-18.5, $\delta_P$: 7-9.5, $\delta_H$: 7-10.5; $R_0$: 4-8), and a linker substance comprising RMG380 high sulphur fuel oil (HSFO) with the Hansen Solubility Parameters ($\delta_D$: 18-19.7, $\delta_P$: 3-6, $\delta_H$: 3-6; $R_0$: 4-6) and a sulphur content of 2.49% by weight in concentrations from 0 to 10 wt. %.

The first fuel blend components with the different linker substance concentrations up to 10% by weight were mixed with a second fuel component comprising ultra low sulphur fuel oil (ULSFO) according to the ISO 8217 RMG 180 ultra low sulphur specification having Hansen Solubility Parameters ($\delta_D$: 18-19.7, $\delta_P$: 3-6, $\delta_H$: 3-4.5; $R_0$: 4-6.5).

As expected, the first fuel blend component without the linker substance was found to be incompatible when mixed the upgraded heavy fraction with two marine fuels (i.e. ultra low sulphur and high sulphur marine fuels) in proportions of 5 to 50 wt. % of upgraded renewable fraction. However, for first fuel blend components comprising 2% by weight or higher of the high sulphur linker substance the blends were found to be compatible. It was further found that the low sulphur fuel blend remained compatible at all ratios by dilution with the ultra low sulphur fuel oil (ULSFO) e.g. ultra low sulphur fuel oil can be added to the same tank as the low sulphur fuel blend according to the present invention without any compatibility issues.

An example of the properties of a low sulphur fuel blend according to the present invention is shown in FIG. 16 for a blend of 62 vol. % first fuel component containing a renewable component (Steeper HF, 350+° C. boiling point fraction).

Example 15: Low Sulphur Blend of a First Fuel Blend Component Comprising the Heavy Fraction of Partially Upgraded Oil (3 wt. % Oxygen) and Marine Gas Oil Blending tests were performed using of a first fuel blend component comprising the heavy fraction (Boiling point 350+° C.) from example 10 with an oxygen content of 3 wt. % and a second fuel blend component comprising marine gas oil (MGO) according to the ISO 8217 DMA standard. The heavy fraction had the Hansen Solubility Parameters ($\delta_D$: 17-19, $\delta_P$: 7.5-12, $\delta_H$: 7-10; $R_0$: 5-9) and Marine Gas Oil (MGO) had the Hansen Solubility Parameters ($\delta_D$: 18-19.7, $\delta_P$: 3-6, $\delta_H$: 3-5; $R_0$: 4.5-6.5). As the RED centers of solubilities are higher than 1 why the blends is expected to be only partially soluble without a linker substance according to the present invention. As seen from spot tests and microscope tests in FIG. 17 this was also observed in the blending test for ratios of 50 wt % Heavy Fraction from partially upgraded renewable oil (HFPUO)/50 wt % Marine Gas Oil (MGO) and 25 wt % HFPUO/75 wt % MGO.

Example 16: Low Sulphur Blend of a First Fuel Blend Component Comprising the Heavy Fraction of Partially Upgraded Oil (3 wt. % 0) and High Sulphur Fuel Oil (HSFO)

Blending tests were performed using of a first fuel blend component comprising the heavy fraction (Boiling point 350+° C.) from example 10 with an oxygen content of 3 wt. % and a second fuel blend component comprising marine gas oil (Ultra Low Sulphur Fuel Oil) according to the ISO 8217 DMA standard. The heavy fraction had the Hansen Solubility Parameters ($\delta_D$: 17-19, $\delta_F$: 7.5-12, $\delta_H$: 7-10; $R_0$: 5-9) and High Sulphur Fuel Oil had the Hansen Solubility Parameters ($\delta_D$: 18-19.7, $\delta_F$: 3-6, $\delta_H$: 3-6; $R_0$: 3-6). As the RED centers of solubilities are close to 1, the blends were expected to be soluble or compatible without a linker substance according to the present invention. As seen from spot tests and microscope tests in FIG. 18 this was also observed in the blending test for ratios of 50 wt. % Heavy Fraction of Partially Upgraded Oil (HFPUO)/50 wt. % High Sulphur Fuel Oil (HSFO) and 25 wt. % HFPUO/75 wt. % HSFO meaning that the HSFO is a suitable linker substance to achieved the main objective of this invention, obtained a low sulphur fuel blend of a first fuel blend component containing a renewable hydrocarbon component as described in example 15.

The invention claimed is:

1. A hydrocarbon blend for input to a refinery and comprising a first blend component containing a renewable hydrocarbon component and a second blend component containing petroleum derived hydrocarbon to form at least part of a final hydrocarbon blend for processing in a refinery wherein the first blend component comprises a hydrocarbon substance with at least 70% by weight having a boiling point above 220° C. and has the characteristics ($\delta_{d1}$, $\delta_{p1}$, $\delta_{h1}$)= (17-20, 6-12, 6-12), wherein the second blend component has the characteristics ($\delta_{d2}$, $\delta_{p2}$, $\delta_{h2}$)=(17-20, 3-5, 4-7), and wherein the first blend component is present in the final hydrocarbon blend in a relative amount of up to 80 wt %.

2. A hydrocarbon blend according to claim 1, wherein the first blend component further comprises a linker substance having the characteristics ($\delta_{d3}$, $\delta_{p3}$, $\delta_{h3}$)=(17-20, 3-6, 4-6), wherein the hydrocarbon substance is present in the first blend component in a relative amount of 90-99.5 wt. %, and the linker substance is present in the first blend component in a relative amount of 0.5 to 10 wt. %.

3. A hydrocarbon blend according to claim 2, wherein the linker substance is an oil with a sulphur content of at least 1% by weight.

4. A hydrocarbon blend according to claim 1, wherein the first blend component containing renewable hydrocarbon component comprises a hydrocarbon substance having at least 70% by weight a boiling point above 300° C.

5. A hydrocarbon blend according to claim 4, wherein the first blend component containing renewable hydrocarbon component comprises a hydrocarbon substance comprising at least 50% by weight having a boiling point above 300° C.

6. A hydrocarbon blend according to claim 4, wherein the first blend component containing renewable hydrocarbon component comprises a hydrocarbon substance comprising at least 10% by weight having a boiling point above 400° C.

7. A hydrocarbon blend according to claim 1, wherein the first blend component is present in the final hydrocarbon blend in a relative amount of between 10-75 wt. %, and wherein the second blend component is present in the final hydrocarbon blend in a relative amount of between 25-90 wt. %.

8. A hydrocarbon blend according to claim 1, wherein the hydrocarbon substance of the first blend component containing renewable hydrocarbon component(-s) has a water content of less than 1% by weight.

9. A hydrocarbon blend according to claim 1, wherein the first blend component has the characteristics ($\delta_{d1}$, $\delta_{p1}$, $\delta_{h1}$)=(17-20, 7-12, 7-12).

10. A hydrocarbon blend according to claim 9 wherein the first blend component has the characteristics ($\delta_{d1}$, $\delta_{p1}$, $\delta_{h1}$)=(17-20, 7-9, 8.5-10).

11. A hydrocarbon blend according to claim 1, wherein the hydrocarbon substance in the first blend component comprising renewable component(-s) has the characteristics ($\delta_d$, $\delta_p$, $\delta_h$)=(18.0-19.5, 6-12, 7-10), and wherein the linker substance has the characteristics ($\delta_{d3}$, $\delta_{p3}$, $\delta_{h3}$)=(17-20, 4-6, 4-7).

12. A hydrocarbon blend according to claim 1, wherein the first blend component is present in the final hydrocarbon blend in a relative amount of between 50-75 wt. %, and wherein the second blend component is present in the final hydrocarbon blend in a relative amount of between 25-50 wt. %, and wherein a linker substance is present in the final hydrocarbon blend in a relative amount of between 0.5 to 5 wt. %.

13. A hydrocarbon blend according to claim 1, further comprising a linker substance that comprises one or more components selected from each of the following groups: ketones, alcohols, alkanes, and aromatics.

14. A hydrocarbon blend according to claim 13, wherein the linker substance comprises 25-90% by weight of ketones, 0.1-40% by weight of alkanes, 1-40% by weight of alcohols and 0.1-20% by weight of toluene and/or xylene and/or creosol.

15. A hydrocarbon blend according to claim 1, wherein the viscosity of the hydrocarbon blend at 50° ° C. is in the range 160-180 cSt, the flashpoint of the hydrocarbon blend above 60° C., the pour point of the hydrocarbon blend is less than 30° C., and the total acid number (TAN) is less than 2.5 mg KOH/g.

16. A hydrocarbon blend according to claim 1, wherein the hydrocarbon substance of first blend component and/or the hydrocarbon substance has a Conradson Carbon Residue number of less than 25.

17. A hydrocarbon blend according to claim 1, wherein at least one of the hydrocarbon substance and the first blend component has a TAN of less than 50 mg KOH/g.

18. A hydrocarbon blend according to claim 1, wherein at least one of the first blend component and the hydrocarbon substance has:
a flash point in the range 60 to 150° C.,
a pour point below 30° C.,
an ash content of less than 0.1% by weight,
a Conradson Carbon Residue number of less than 20, and
an acid number of less than 2.5 mg KOH/g.

19. A hydrocarbon blend according to claim 1, wherein the hydrocarbon substance of the first blend component has an oxygen content of less than 15% by weight.

20. A hydrocarbon blend according to claim 1 wherein at least one of the first hydrocarbon blend component and the hydrocarbon substance has an oxygen content of less than 5% by weight.

21. A hydrocarbon blend according to claim 20, wherein the hydrocarbon substance of the first blend component has a viscosity at 50° C. in the range of 1000-10000 cSt.

22. A method according to claim 1, wherein at least one of the first blend component and the second blend component is heated to a temperature in the range 70-150° C. prior to forming the hydrocarbon blend.

23. A method of producing a hydrocarbon blend containing a renewable hydrocarbon component comprising:
providing a first blend component comprising the renewable hydrocarbon component having the characteristics $(\delta_{d1}, \delta_{p1}, \delta_{h1})=(17\text{-}20, 6\text{-}10, 6\text{-}10)$;
providing a second blend component characterised by having the characteristics $(\delta_{d2}, \delta_{p2}, \delta_{h2})=(17\text{-}20, 3\text{-}6, 3\text{-}6)$; and
adding the first blend component to the second blend component to form the hydrocarbon blend so that the first blend is added in an amount of up to 80% by weight of the hydrocarbon blend.

24. A method according to claim 23, wherein the hydrocarbon substance of the first blend component is produced from biomass and/or waste.

25. A method according to claim 24, wherein the production of the hydrocarbon substance of the first blend component is performed by a hydrothermal liquefaction process.

26. A method according to claim 25, wherein the hydrocarbon substance of the first blend component is produced by:
a. providing one or more biomass and/or waste materials contained in one or more feedstock;
b. providing a feed mixture by slurrying the biomass and/or waste material(-s) in one or more fluids at least one of which comprises water;
c. pressurizing the feed mixture to a pressure in the range 100 to 400 bar;
d. heating the pressurized feed to a temperature in the range 300° C. to 450° C.;
e. maintaining the pressurized and heated feed mixture in a reaction zone in a reaction zone for a conversion time of 3 to 30 minutes;
f. cooling the converted feed mixture to a temperature in the range 25° C. to 200° C.;
g. expanding the converted feed mixture to a pressure of 1 to 120 bar; and
h. separating the converted feed mixture into a crude oil, a gas phase and a water phase comprising water soluble organics and dissolved salts.

27. A method according to claim 23, further comprising forming an intermediate blend component comprising a hydrocarbon substance containing hydrocarbon and a linker substance, wherein the hydrocarbon substance has the characteristics $(\delta_{d1}, \delta_{p1}, \delta_{h1})=(17\text{-}20, 6\text{-}12, 7\text{-}10)$, wherein the linker substance has the characteristics $(\delta_{d3}, \delta_{p3}, \delta_{h3})=(17\text{-}20, 3\text{-}6, 3\text{-}6)$, wherein the hydrocarbon substance is present in the intermediate blend component in a relative amount of between 90-99.5 wt. %, and wherein the linker substance is present in the intermediate blend component in a relative amount of between 0.5 to 10 wt. %.

28. A method according to claim 27, wherein the hydrocarbon substance is present in the intermediate blend component in a relative amount of between 95-99.5 wt. %, and wherein the linker substance is present in the intermediate blend component in a relative amount of up between 0.5 to 5 wt. %.

29. A method of producing a hydrocarbon blend according to claim 23, where the method further comprises the steps of:
providing a linker substance having the characteristics $(\delta_{d3}, \delta_{p3}, \delta_{h3})=(17\text{-}20, 3\text{-}6, 3\text{-}6)$ in a relative amount of between 0.5 to 10 wt. % of the final hydrocarbon blend;
adding the linker substance to the one of the first and second blend components to form an intermediate blend component; and
adding the other of the first and second blend components to the intermediate blend component to form the hydrocarbon blend.

30. A method according to claim 29, wherein the intermediate blend component comprising the one of the first and second blend components and the linker substance is manipulated to form a homogenous mixture prior to adding the other of the first and second blend components to form the hydrocarbon blend.

31. A method according to claim 30, wherein the manipulation to form a homogenous mixture is carried out by stirring the mixture or by pumping the mixture.

32. A method according to claim 29, the method further comprising measuring the characteristics $(\delta_{d1}, \delta_{p1}, \delta_{p1}, \delta_{h1})$ of the first blend component containing the renewable hydrocarbon component; measuring the characteristics $(\delta_{d2}, \delta_{p2}, \delta_{h2})$ of second second blend component; and determining the compatibility of the first and the second component based on the measurement of the characteristics.

33. A method according to claim 32, wherein the compatibility is determined to be present based on the measured characteristics, and the first blend component and the second blend components are accepted for direct mixing.

34. A method according to claim 33, wherein the first blend component and the second blend component are determined to be incompatible based on the measured characteristics, wherein a linker substance is selected having characteristics $((\delta_{d3}, \delta_{p3}, \delta_{h3}))$, and wherein the linker substance is added to the first blend component or the second blend component to achieve compatibility.

* * * * *